US007808334B2

United States Patent
Yoshida et al.

(10) Patent No.: US 7,808,334 B2
(45) Date of Patent: Oct. 5, 2010

(54) OSCILLATION DRIVER CIRCUIT, OSCILLATION DRIVER DEVICE, PHYSICAL QUANTITY MEASUREMENT CIRCUIT, PHYSICAL QUANTITY MEASUREMENT DEVICE, AND ELECTRONIC INSTRUMENT

(75) Inventors: Naoki Yoshida, Suwa (JP); Masahiro Kanai, Suwa (JP); Eitaro Otsuka, Funabashi (JP)

(73) Assignee: Seiko Epson Corporation, Tokyo (JP)

( * ) Notice: Subject to any disclaimer, the term of this patent is extended or adjusted under 35 U.S.C. 154(b) by 198 days.

(21) Appl. No.: 12/177,607

(22) Filed: Jul. 22, 2008

(65) Prior Publication Data

US 2009/0084180 A1    Apr. 2, 2009

(30) Foreign Application Priority Data

Jul. 24, 2007    (JP)    ............... 2007-192400

(51) Int. Cl.
*H03L 5/00*    (2006.01)
*H03B 5/36*    (2006.01)
*G01P 15/09*    (2006.01)

(52) U.S. Cl. ................. 331/158; 331/109; 331/116 FE; 331/173; 73/514.34; 310/329

(58) Field of Classification Search .............. 331/109, 331/116 FE, 116 M, 116 R, 154, 158–160, 331/172, 173, 182, 183; 73/488, 514.01, 73/514.34, 579; 310/316.01, 329
See application file for complete search history.

(56) References Cited

U.S. PATENT DOCUMENTS 4,684,842 A * 8/1987 Maruno et al. ......... 310/316.01
6,412,347 B1    7/2002 Kuroda et al.
6,429,571 B2 * 8/2002 Raffalt et al. .......... 310/316.01
6,553,835 B1    4/2003 Hobbs et al.
6,894,577 B2 * 5/2005 Styduhar ..................... 331/183
7,292,114 B2 * 11/2007 Greenberg ................... 331/158
7,710,212 B2 * 5/2010 Seliverstov ................. 331/183

FOREIGN PATENT DOCUMENTS

JP    A-10-232132    9/1998
JP    A-2000-88581    3/2000

(Continued)

OTHER PUBLICATIONS

U.S. Appl. No. 11/882,203 in the name of Kanai et al. filed Jul. 31, 2007.
U.S. Appl. No. 11/898,033 in the name of Kanai et al. filed Sep. 7, 2007.

(Continued)

*Primary Examiner*—Robert Pascal
*Assistant Examiner*—Levi Gannon
(74) *Attorney, Agent, or Firm*—Oliff & Berridge, PLC

(57) ABSTRACT

An oscillation driver circuit that drives a physical quantity transducer includes a one-input/two-output comparator. The one-input/two-output comparator includes a shared differential section that compares a voltage signal input from a drive current/voltage conversion amplifier circuit with a given voltage, a first output section that receives a signal output from the differential section, variably adjusts a voltage amplitude of the received signal, and outputs the resulting signal, and a second output section that receives the signal output from the differential section, and outputs a synchronous detection reference signal of which the voltage amplitude is fixed.

15 Claims, 17 Drawing Sheets

FOREIGN PATENT DOCUMENTS

| | | |
|---|---|---|
| JP | A-2002-174520 | 6/2002 |
| JP | A-2002-188925 | 7/2002 |
| JP | A-2002-350139 | 12/2002 |
| JP | A-2006-010408 | 1/2006 |
| WO | WO 2006/129712 A1 | 12/2006 |

OTHER PUBLICATIONS

U.S. Appl. No. 11/984,977 in the name of Kanai et al. filed Nov. 26, 2007.

* cited by examiner

US 7,808,334 B2

OSCILLATION DRIVER CIRCUIT, OSCILLATION DRIVER DEVICE, PHYSICAL QUANTITY MEASUREMENT CIRCUIT, PHYSICAL QUANTITY MEASUREMENT DEVICE, AND ELECTRONIC INSTRUMENT

Japanese Patent Application No. 2007-192400 filed on Jul. 24, 2007, is hereby incorporated by reference in its entirety.

BACKGROUND OF THE INVENTION

The present invention relates to an oscillation driver circuit, an oscillation driver device, a physical quantity measurement circuit, a physical quantity measurement device (e.g., vibrating gyrosensor), an electronic instrument, and the like.

Gyrosensors are classified as a rotating gyrosensor, a vibrating gyrosensor, and the like depending on the method of detecting the force applied to an object. In particular, a vibrating gyrosensor is considered to be advantageous for reducing size and cost from the viewpoint of the constituent elements and the like.

A vibrating gyrosensor that detects an angular velocity causes a physical quantity transducer (vibrator) to produce driving vibrations in a specific direction. When an angular velocity is applied to the vibrator, a Coriolis force occurs perpendicularly to the driving vibrations to produce detection vibrations. Since the detection vibrations occur perpendicularly to the driving vibrations, a detection signal (signal component due to the detection vibrations) differs in phase from a drive signal (signal component due to the driving vibrations) by 90 degrees. The detection signal can be synchronously extracted (detected) separately from the drive signal utilizing the above phenomenon, for example.

A reduction in size and an increase in reliability of vibrating gyrosensors can be achieved using a crystal vibrator.

A vibrating gyrosensor is used in a wide variety of applications, such as shake detection utilized for a video camera or a digital camera, positioning using the global positioning system (GPS) utilized for a car navigation system, and aircraft or robot position detection.

A vibrating gyrosensor is normally driven by a battery. Therefore, it is necessary to increase the life of the battery by reducing the power consumption of the vibrating gyrosensor as much as possible. Accordingly, it is important to thoroughly reduce the power consumption of the vibrating gyrosensor.

Since a reduction in size is strongly desired for electronic instruments (e.g., video camera and digital camera), it is important to reduce the size of a vibrating gyrosensor.

A related-art vibrating gyrosensor drives a vibrator using a sine-wave signal with a given frequency, for example. Since the gain (loop gain) in the oscillation loop must be controlled to be unity in order to maintain oscillations, a gain control amplifier (GCA) is provided in the oscillation loop.

A synchronous detection process is performed to remove noise (e.g., a leakage component of a drive signal of the vibrator) superimposed on a detection signal obtained from the vibrator. The synchronous detection process requires a synchronous detection reference signal. The synchronous detection reference signal is a rectangular-wave signal.

A gain control amplifier (GCA) and a circuit (e.g., comparator) that generates a rectangular-wave synchronous detection reference signal are separately provided (i.e., independent circuits) (see JP-A-10-232132 and JP-A-2006-10408, for example).

The circuit area and power consumption can be reduced by forming the gain control amplifier (GCA) and the amplifier circuit (e.g., comparator) that generates the synchronous detection reference signal using a common circuit.

However, since different characteristics are required for the gain control amplifier (GCA) that adjusts the voltage amplitude of a sine-wave signal and the circuit (e.g., comparator) that generates the rectangular-wave synchronous detection reference signal, these circuits cannot be formed using a common circuit.

When forming the vibrator using a rock crystal with a high Q value and hermetically sealing the vibrator in a package, the driving Q value of the vibrator increases to a large extent. Therefore, the time (startup time) elapsed until a signal from the vibrator is stabilized increases when causing the vibrator to produce driving vibrations.

In order to reduce power consumption, it is preferable to suspend the operation of an unnecessary circuit when a physical quantity such as an angular velocity need not be detected (i.e., provide a low power consumption mode). In this case, a quick transition to a normal operation must be taken into consideration. In particular, when using a crystal vibrator, it is considerably difficult to achieve a quick transition to a normal operation due to an increase in startup time.

Moreover, it is necessary to prevent a situation in which the vibrator breaks down due to an overcurrent in the low power consumption mode and the normal operation mode.

SUMMARY

According to one aspect of the invention, there is provided an oscillation driver circuit that is connected to a physical quantity transducer to form an oscillation loop and causes the physical quantity transducer to produce driving vibrations by applying a rectangular-wave drive signal to the physical quantity transducer, the oscillation driver circuit comprising:

a drive current/voltage conversion amplifier circuit that converts a current signal from the physical quantity transducer into a voltage signal; and a comparator that receives the voltage signal output from the drive current/voltage conversion amplifier circuit through an input node, outputs a drive signal through a first output node, and outputs a synchronous detection reference signal through a second output node, the comparator including:

a differential section that compares the voltage signal input from the drive current/voltage conversion amplifier circuit with a given voltage;

a first output section that receives a signal output from the differential section, variably adjusts a voltage amplitude of the received signal, and outputs the resulting signal; and a second output section that receives the signal output from the differential section, and outputs the synchronous detection reference signal, a voltage amplitude of the synchronous detection reference signal being fixed.

According to another aspect of the invention, there is provided an oscillation driver device comprising:

the above oscillation driver circuit; and the physical quantity transducer that is caused to oscillate by the oscillation driver circuit.

According to another aspect of the invention, there is provided a physical quantity measurement circuit comprising:

the above oscillation driver circuit; and a detection circuit that includes a detection current/voltage conversion amplifier circuit that converts a current signal from the physical quantity transducer into a voltage signal, and a synchronous detection circuit that performs a synchronous detection process based on the synchronous detection reference signal output from the oscillation driver circuit, the synchronous detection circuit being provided in a subsequent stage of the detection current/voltage conversion amplifier circuit.

According to another aspect of the invention, there is provided a physical quantity measurement device comprising:

the above physical quantity measurement circuit; and the physical quantity transducer that is caused to oscillate by the oscillation driver circuit.

According to another aspect of the invention, there is provided an electronic instrument comprising the above oscillation driver device.

According to another aspect of the invention, there is provided an electronic instrument comprising the above physical quantity measurement device.

DETAILED DESCRIPTION OF THE EMBODIMENT

Figure 1:
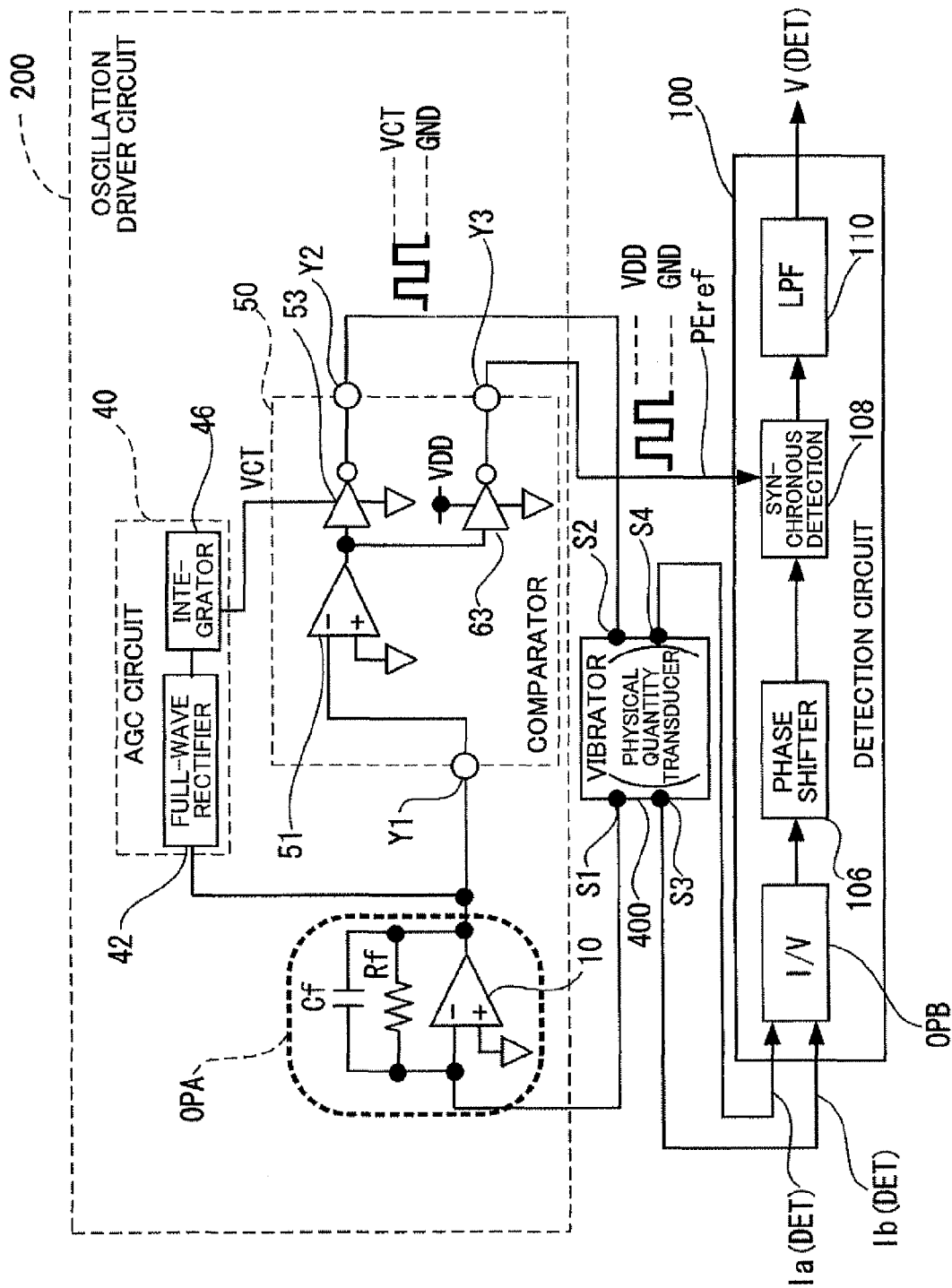
FIG. 1 is a circuit diagram showing the configuration of a physical quantity measurement device (including an oscillation driver circuit, a detection circuit, and a physical quantity transducer) according to the invention.

Several embodiments of the invention enable a gain control amplifier (GCA) and a circuit (e.g., comparator) that generates a synchronous detection reference signal to be formed using a common circuit. These embodiments enable a quick transition to a steady oscillation state. These embodiments also implement an efficient low power consumption mode, enable a quick transition from a low power consumption to a normal operation mode, and effectively prevent a situation in which a physical quantity transducer breaks down due to an overcurrent, for example.

(1) According to one embodiment of the invention, there is provided an oscillation driver circuit that is connected to a physical quantity transducer to form an oscillation loop and causes the physical quantity transducer to produce driving vibrations by applying a rectangular-wave drive signal to the physical quantity transducer, the oscillation driver circuit comprising:

a drive current/voltage conversion amplifier circuit that converts a current signal from the physical quantity transducer into a voltage signal; and a comparator that receives the voltage signal output from the drive current/voltage conversion amplifier circuit through an input node, outputs a drive signal through a first output node, and outputs a synchronous detection reference signal through a second output node, the comparator including:

a differential section that compares the voltage signal input from the drive current/voltage conversion amplifier circuit with a given voltage;

a first output section that receives a signal output from the differential section, variably adjusts a voltage amplitude of the received signal, and outputs the resulting signal; and a second output section that receives the signal output from the differential section, and outputs the synchronous detection reference signal, a voltage amplitude of the synchronous detection reference signal being fixed.

This embodiment employs a method that drives the physical quantity transducer using a rectangular wave. This method utilizes a phenomenon in which unnecessary harmonics are reduced due to the frequency filtering effect of the physical quantity transducer even when driving the physical quantity transducer using a rectangular wave with a given frequency (including third-order and fifth-order harmonic components) so that a drive signal with a desired frequency (resonance frequency) is obtained.

When driving the physical quantity transducer using a rectangular wave, it suffices that the gain control amplifier (GCA) adjust the amplitude of the rectangular-wave drive signal. On the other hand, the synchronous detection reference signal can be generated based on the rectangular-wave drive signal (e.g., a rectangular wave that swings to the maximum between power supply voltages in synchronization with the drive signal can be generated). Specifically, these operations are performed based on the rectangular-wave drive signal, and merely differ as to the process relating to the amplitude of the rectangular-wave signal. Therefore, these operations can be implemented by a one-input/two-output comparator.

Specifically, the differential section (differential circuit that determines whether to output a signal set at the H level or the L level) that compares the drive signal (input voltage signal) with the given voltage is shared, and the first and second output sections that receive the signal output from the shared differential section are provided. The function of the GCA is implemented by variably adjusting the voltage amplitude of the signal output from the first output section. On the other hand, the voltage amplitude of the signal output from the second output section (i.e., synchronous detection reference signal) is made constant (fixed) (e.g., swung to the maximum between the power supply voltages).

The differential-stage circuit area can be approximately halved by sharing the differential section as compared with the case where the differential section is not shared. Moreover, power consumption can be reduced. Since a considerable amount of current is required as the operating current of the differential section in order to increase accuracy, power consumption can be reduced to a large extent by sharing the differential section. Moreover, since the phase of the oscillation drive signal in the oscillation loop coincides with the phase of the synchronous detection reference signal (synchronization clock signal) by sharing the circuit, the detection accuracy of the physical quantity measurement device is improved due to the minimum phase shift.

(2) In the oscillation driver circuit, the oscillation driver circuit may include an automatic gain control circuit that automatically adjusts a gain in the oscillation loop, when the oscillation loop is in a steady oscillation state, the comparator may control a voltage amplitude of a rectangular-wave signal output from the first output section so that the gain in the oscillation loop becomes unity based on a gain control signal output from the automatic gain control circuit; and the second output section may output a rectangular-wave signal as the synchronous detection reference signal, a voltage level of the rectangular-wave signal being a power supply voltage level of the oscillation driver circuit.

Specifically, the automatic gain control circuit (AGC circuit) that automatically adjusts the gain in the oscillation loop is provided. The voltage gain of the signal output from the first output section is adjusted to unity during the steady oscillation state using the gain control signal output from the AGC circuit, Therefore, the differential section and the first output section function as a gain control amplifier (GCA). The voltage amplitude of the signal output from the second output section is not adjusted. Therefore, a rectangular-wave signal (i.e., synchronous detection reference signal) at the power supply voltage level (e.g., a power supply voltage VDD and a ground power supply voltage) of the oscillation driver circuit is obtained. Therefore, the differential section and the second output section function as a clock signal generator that generates the synchronous detection reference signal (synchronization clock signal).

(3) In the oscillation driver circuit, the oscillation driver circuit may include:

a first loop switch provided in a first signal path that connects the first output node with the physical quantity transducer; and a second loop switch provided in a second signal path that connects the second output node with the physical quantity transducer, the first loop switch and the second loop switch may be complementarily turned ON, a first oscillation loop that passes through the first signal path may be formed when the first loop switch is turned ON, and a second oscillation loop that passes through the second signal path may be formed when the second loop switch is turned ON;

during oscillation startup, the second loop switch may be turned ON, and the physical quantity transducer may be caused to oscillate while setting a gain in the second oscillation loop to be larger than unity; and during the steady oscillation state, the first loop switch may be turned ON, and the physical quantity transducer may be caused to oscillate through the first oscillation loop, a gain in the first oscillation loop being adjusted to unity.

According to this embodiment, the second output section functions as an element that forms the second oscillation loop in addition to a means that generates the synchronous detection reference signal, The second oscillation loop is used to quickly implement a steady oscillation state during oscillation startup (i.e., a transitional state before a transition to the steady oscillation state occurs), and the gain in the second oscillation loop is set to be equal to or larger than unity. The first oscillation loop is used during the steady oscillation state. The loop gain in the first oscillation loop is set to be unity. The oscillation loop is switched between the first and second oscillation loops by causing the first and second loop switches to be complementarily turned ON. Since the oscillation driver circuit has the second oscillation loop of which the loop gain is set to be larger than unity, a transition from oscillation startup to the steady oscillation state can be accelerated. This makes it possible to cause the physical quantity transducer to oscillate quickly.

(4) In the oscillation driver circuit, the first loop switch and the second loop switch may be complementarily turned ON based on an oscillation detection signal output from an oscillation detector included in the automatic gain control circuit.

Specifically, the first and second loop switches are ON/OFF-controlled using the oscillation detector included in the automatic gain control circuit (AGC circuit). The AGC circuit includes a circuit that rectifies a signal in the oscillation loop and detects a direct current level, for example. The oscillation state can be detected by monitoring the direct current level. Therefore, the oscillation loop is switched corresponding to the loop state based on the oscillation detection signal from the oscillation detector provided in the AGC circuit. The loop switch can be ON/OFF-controlled without providing an additional circuit.

(5) In the oscillation driver circuit, the oscillation driver circuit may include a current limiter circuit that limits an amount of current that flows through at least either a current path that connects a high-potential-side power supply node and the second output node of the second output section or a current path that connects a low-potential-side power supply node and the second output node of the second output section.

Since the gain in the second oscillation loop that passes through the second output section (gain) is larger than unity, an overcurrent may flow through the physical quantity transducer (e.g., crystal vibrator or piezoelectric element) due to an increase in voltage amplitude of the oscillation signal. In this case, a vibrator of the physical quantity transducer may break down, for example. Therefore, a current limiter circuit that limits the current capability of the second output section is provided (e.g., the output-stage power supply current is made constant using the current limiter circuit). This embodiment effectively prevents a situation in which the physical quantity transducer breaks down due to an overcurrent by simply modifying the circuit.

(6) In the oscillation driver circuit, the oscillation driver circuit may have at least a normal operation mode and a low power consumption mode, when the low power consumption mode has been selected, the oscillation driver circuit may be partially turned OFF and the second loop switch may be turned ON so that the physical quantity transducer is caused to oscillate while setting the gain in the second oscillation loop to be larger than unity.

The low power consumption mode (sleep mode or standby mode) in which the operations of unnecessary circuits are stopped (OFF) is provided in order to reduce the power consumption of the oscillation driver circuit. This enables a further reduction in power consumption in addition to sharing the differential section. In order to enable a quick transition to a normal operation mode (i.e., a mode in which a physical quantity such as an angular velocity is detected), the second loop switch is turned ON during the low power consumption mode so that the physical quantity transducer is caused to oscillate in a state in which the gain in the second oscillation loop is larger than unity. Specifically, an oscillation state similar to that during oscillation startup is maintained during the low power consumption mode. As a result, a quick transition to the steady oscillation state can be achieved.

(7) In the oscillation driver circuit, a voltage amplitude of a rectangular-wave signal output from the first output section of the comparator may be adjusted so that a gain in the oscillation loop is larger than unity during oscillation startup, and may be adjusted so that the gain in the oscillation loop is unity during the steady oscillation state.

In the embodiments defined in (3) and (4), the oscillation loop is switched corresponding to oscillation startup and the steady oscillation state. In this embodiment, only one oscillation loop (i.e., the oscillation loop including the first output section) is provided. On the other hand, the voltage amplitude of the signal output from the first output section is changed corresponding to oscillation startup and the steady oscillation state. The amplitude necessary for oscillations can be quickly obtained during oscillation startup by setting the gain in the oscillation loop to be larger than unity. Therefore, a quick transition to the steady oscillation state can be achieved.

(8) In the oscillation driver circuit, the oscillation driver circuit may include:

a first power supply voltage switch that supplies a first power supply voltage that adjusts the gain in the oscillation loop to unity to a high-potential-side power supply node of the first output section; and a second power supply voltage switch that supplies a second power supply voltage that adjusts the gain in the oscillation loop to be larger than unity to the high-potential-side power supply node of the first output section, the first power supply voltage switch and the second power supply voltage switch may be complementarily turned ON; and the first power supply voltage switch may be turned ON during the steady oscillation state, and the second power supply voltage switch may be turned ON during oscillation startup.

The power supply voltage is switched in order to change the voltage amplitude of the signal output from the first output section. The first and second power supply voltage switches are provided, and the first power supply voltage that adjusts the gain in the oscillation loop to unity is supplied when the first power supply voltage switch is turned ON. The second power supply voltage that adjusts the gain in the oscillation loop to be larger than unity is supplied when the second power supply voltage switch is turned ON.

(9) In the oscillation driver circuit, the oscillation driver circuit may include a current limiter circuit that limits an amount of current that flows through at least either a current path that connects a high-potential-side power supply node and the first output node of the first output section or a current path that connects a low-potential-side power supply node and the first output node of the first output section.

When the oscillation driver circuit has set the gain in the oscillation loop to be larger than unity by increasing the voltage amplitude of the signal output from the first output section during oscillation startup, an overcurrent may flow through the physical quantity transducer (e.g., crystal vibrator or piezoelectric element), whereby the vibrator of the physical quantity transducer may break down, for example. Therefore, the current limiter circuit that limits the current capability of the first output section is provided. For example, the output-stage power supply current is made constant using the current limiter circuit. This embodiment effectively prevents a situation in which the physical quantity transducer breaks down due to an overcurrent by simply modifying the circuit.

(10) In the oscillation driver circuit, the oscillation driver circuit may have at least a normal operation mode and a low power consumption mode, when the low power consumption mode has been selected, the oscillation driver circuit may be partially turned OFF, and the voltage amplitude of the rectangular-wave signal output from the first output section of the comparator may be adjusted so that the gain in the oscillation loop is larger than unity.

The low power consumption mode (sleep mode or standby mode) in which the operations of unnecessary circuits are stopped (OFF) is provided in order to reduce the power consumption of the oscillation driver circuit. This enables a further reduction in power consumption in addition to sharing the differential section. In order to enable a quick transition to a normal operation mode (i.e., a mode in which a physical quantity such as an angular velocity is detected), the physical quantity transducer is caused to oscillate during the low power consumption mode in a state in which the gain in the oscillation loop is larger than unity by increasing the voltage amplitude of the first output section. Specifically, an oscillation state similar to that during oscillation startup is maintained during the low power consumption mode. As a result, a quick transition to the steady oscillation state can be achieved.

(11) According to another embodiment of the invention, there is provided an oscillation driver device comprising:

one of the above oscillation driver circuits; and the physical quantity transducer that is caused to oscillate by the oscillation driver circuit.

Since the oscillation driver circuit according to the above embodiment has a reduced size and consumes a small amount of power, the oscillation driver device can also achieve the same effects as those of the oscillation driver circuit. In particular, a further reduction in size and an increase in oscillation accuracy can be achieved when using a crystal vibrator as the physical quantity transducer.

(12) According to another embodiment of the invention, there is provided a physical quantity measurement circuit comprising:

one of the oscillation driver circuits; and a detection circuit that includes a detection current/voltage conversion amplifier circuit that converts a current signal from the physical quantity transducer into a voltage signal, and a synchronous detection circuit that performs a synchronous detection process based on the synchronous detection reference signal output from the oscillation driver circuit, the synchronous detection circuit being provided in a subsequent stage of the detection current/voltage conversion amplifier circuit.

Since the oscillation driver circuit according to the above embodiment has a reduced size and consumes a small amount of power, the physical quantity measurement circuit according to this embodiment can also achieve the same effects as those of the oscillation driver circuit. In particular, a further reduction in size and an increase in oscillation accuracy and detection accuracy can be achieved when using a crystal vibrator as the physical quantity transducer.

(13) According to another embodiment of the invention, there is provided a physical quantity measurement device comprising:

the above physical quantity measurement circuit; and the physical quantity transducer that is caused to oscillate by the oscillation driver circuit.

Since the oscillation driver circuit according to the above embodiment has a reduced size and consumes a small amount of power, the physical quantity measurement device can also achieve the same effects as those of the oscillation driver circuit. In particular, a further reduction in size and an increase in oscillation accuracy and detection accuracy can be achieved when using a crystal vibrator as the physical quantity transducer.

(14) According to another embodiment of the invention, there is provided an electronic instrument comprising the above oscillation driver device.

The oscillation driver circuit according to the above embodiment has a reduced size and consumes a small amount of power A small and high-performance electronic instrument can be implemented by providing the oscillation driver device in an electronic instrument.

(15) According to another embodiment of the invention, there is provided an electronic instrument comprising the above physical quantity measurement device.

The physical quantity measurement device according to the above embodiment has a reduced size and consumes a small amount of power. A small and high-performance electronic instrument can be implemented by providing the physical quantity measurement device in an electronic instrument.

Embodiments of the invention are described in detail below with reference to the drawings. Note that the following embodiments do not in any way limit the scope of the invention laid out in the claims. Note that all elements of the following embodiments should not necessarily be taken as essential requirements for the invention.

First Embodiment

An outline of the main embodiment of the invention is given below. FIG. 1 is a circuit diagram showing the configuration of a physical quantity measurement device (including an oscillation driver circuit, a detection circuit, and a physical quantity transducer) according to the invention. The main configuration and the operation of the physical quantity measurement device according to this embodiment are described below.

Oscillation conditions during oscillation startup and stable oscillation state

An oscillation driver circuit 200 drives a physical quantity transducer 400 by means of an oscillation loop. The loop gain of the oscillation driver circuit 200 according to this embodiment is set to be larger than unity during oscillation startup in order to enable high-speed startup. Specifically, the oscillation conditions during oscillation startup are satisfied when the loop gain is larger than unity and the phase in the loop is 360°×n (n is an integer). The oscillation conditions during a stable oscillation state are satisfied when the loop gain is unity and the phase in the loop is 360°×n (n is an integer).

Power Supply Voltage of Oscillation Driver Circuit

The oscillation driver circuit 200 shown in FIG. 1 operates between a power supply voltage VDD (high-potential-side power supply) and a power supply voltage GND (ground potential: low-potential-side power supply). Note that an analog ground voltage (AGND: the analog ground voltage AGND is a reference potential of the circuit and does not necessarily coincide with the power supply voltage GND) may be used instead of the power supply voltage GND (ground potential). Specifically, the power supply potential which may be used differs depending on the type of the physical quantity transducer (vibrator) 400.

When the physical quantity transducer 400 is a capacitive-coupling transducer (i.e., a direct-current blocking capacitor lies in a signal path in the internal equivalent circuit), a direct current is cut off. Therefore, with regard to the direct current level (bias point) of the oscillation loop, it suffices that the voltage amplitude of a drive signal of the oscillation loop be adjusted regardless of the circuit operation. Therefore, an arbitrary potential (including GND and AGND) may be basically used as the low-potential-side power supply, for example.

When the physical quantity transducer 400 is a variable-resistance transducer, it is necessary to set the bias voltage of the oscillation loop at a desired level. Therefore, an analog ground voltage (AGND: reference voltage in the circuit) at a desired level is generally used.

The power supply method is classified as a single power supply method (i.e., only a positive power supply is used) and a dual power supply method (i.e., positive and negative power supplies are used). The dual power supply method is used when accuracy is important.

In the invention, both of the above-mentioned power supply methods may be employed. In FIG. 1 (the same applies to other drawings), the physical quantity transducer 400 is a capacitive-coupling transducer. The following description is given on the assumption that the oscillation driver circuit 200 operates between the power supply voltage VDD) (e.g., 5 V) and the power supply voltage GND (ground potential) using the single power supply method.

Rectangular-Wave Drive

The invention employs a method that drives the physical quantity transducer using a rectangular wave. This method utilizes a phenomenon in which unnecessary harmonics are reduced due to the frequency filtering effect of the physical quantity transducer even when driving the physical quantity transducer using a rectangular wave with a given frequency (including third-order and fifth-order harmonic components) so that a drive signal with a desired frequency (resonance frequency) is obtained.

Overall configuration of physical quantity measurement device and shared differential section of oscillation driver circuit As shown in FIG. 1, the physical quantity measurement device includes the oscillation driver circuit 200 that causes the physical quantity transducer 400 to oscillate using a rectangular-wave drive signal, and a detection circuit 100 that detects a detection signal (i.e., a current signal that indicates a change in physical quantity) from the physical quantity transducer 400. The detection circuit 100 includes a first-stage current/voltage conversion amplifier circuit (OP B), a phase shifter 106, a synchronous detection circuit 108, and a low-pass filter (LPF) 110.

The oscillation driver circuit 200 includes a drive current/voltage conversion amplifier circuit (OPA), an automatic gain control circuit (hereinafter referred to as "AGC circuit") 40 that automatically controls the gain in the oscillation loop, and a one-input/two-output comparator 50.

The comparator 50 is a two-stage-output comparator with a shared differential section, and has a function of a gain control amplifier (GCA) and a function of a synchronization clock signal generation circuit that generates a synchronous detection reference signal (the comparator 50 may be hereinafter referred to as "composite comparator").

The physical quantity transducer 400 is connected to the oscillation driver circuit 200. The type of the physical quantity transducer 400 is not particularly limited. Note that an increase in accuracy and a reduction in size of the oscillation driver device can be achieved using a crystal vibrator with a high Q value as the physical quantity transducer 400. In FIG. 1, S1 and S2 indicate oscillation terminals of the physical quantity transducer 400, and S3 and S4 indicate detection terminals of the physical quantity transducer 400.

The drive current/voltage conversion amplifier circuit (OPA) provided in the first stage of the oscillation driver circuit 200 includes a feedback resistor Rf, a feedback capacitor Rf, and an operational amplifier 10. The drive current/voltage conversion amplifier circuit (OPA) is an integral current/voltage conversion amplifier having low-pass filter characteristics. The drive current/voltage conversion amplifier circuit (OPA) is an element that forms the oscillation loop. The drive current/voltage conversion amplifier circuit (OPA) converts a current signal from the physical quantity transducer 400 into a voltage signal. Unnecessary oscillations can be effectively prevented due to the low-pass filter characteristics. Moreover, the phase of a signal with a given frequency can be rotated by a given amount by adjusting the resistance of the feedback resistor Rf and the capacitance of the feedback capacitor Rf to appropriate values.

The AGC circuit 40 has a function of automatically adjusting (controlling) the gain (loop gain) of the oscillation loop to unity during the steady oscillation state. The AGC circuit 40 includes a full-wave rectifier 42 and an integrator 46. The AGC circuit 40 may further include an oscillation detector The comparator 50 is a composite comparator having a function of a gain control amplifier (GCA) that adjusts the gain in the oscillation loop and a function of generating a synchronous detection reference signal (synchronization clock signal) PEref. The comparator 50 includes a shared differential section (differential circuit) 51, a first output section (output circuit) 53, and a second output section (output circuit) 63.

A voltage signal (Vin) from the drive current/voltage conversion amplifier circuit (OPA) is input to an input node (Y1) of the comparator 50. The voltage signal (Vin) from the drive current/voltage conversion amplifier circuit (OPA) may be directly input to the comparator 50, or may be input to the comparator 50 through a phase shifter or the like.

The drive signal that causes the physical quantity transducer 400 to oscillate is output from a first output node (Y2), and the synchronous detection reference signal (PEref) is output from a second node (Y3).

The shared differential section (differential circuit) 51 compares the voltage signal (Vin) from the drive current/voltage conversion amplifier circuit (OPA) with a given voltage (hereinafter referred to as "VR0") to determine whether to output a signal set at the H level or the L level.

The first output section 53 receives the signal output from the differential section 51, variably adjusts the voltage amplitude of the received signal, and outputs the resulting signal. Specifically, the voltage gain of the signal output from the first output section 53 is adjusted to unity during the steady oscillation state using a gain control signal VCT output from the AGC circuit 40. The differential section 51 and the first output section 53 function as a gain control amplifier (GCA).

The voltage amplitude of the signal output from the second output section 63 is not adjusted. Therefore, a rectangular-wave signal (i.e., synchronous detection reference signal PEref) at the power supply voltage level (e.g., the power supply voltage VDD and the ground power supply voltage (GND)) of the oscillation driver circuit 200 is obtained. The differential section 51 and the second output section 63 function as a clock signal generator that generates the synchronous detection reference signal (synchronization clock signal).

The composite comparator 50 shown in FIG. 1 thus has a function of a gain control amplifier (GCA) and a function of generating the synchronous detection reference signal PEref (synchronization clock signal).

Figure 2:
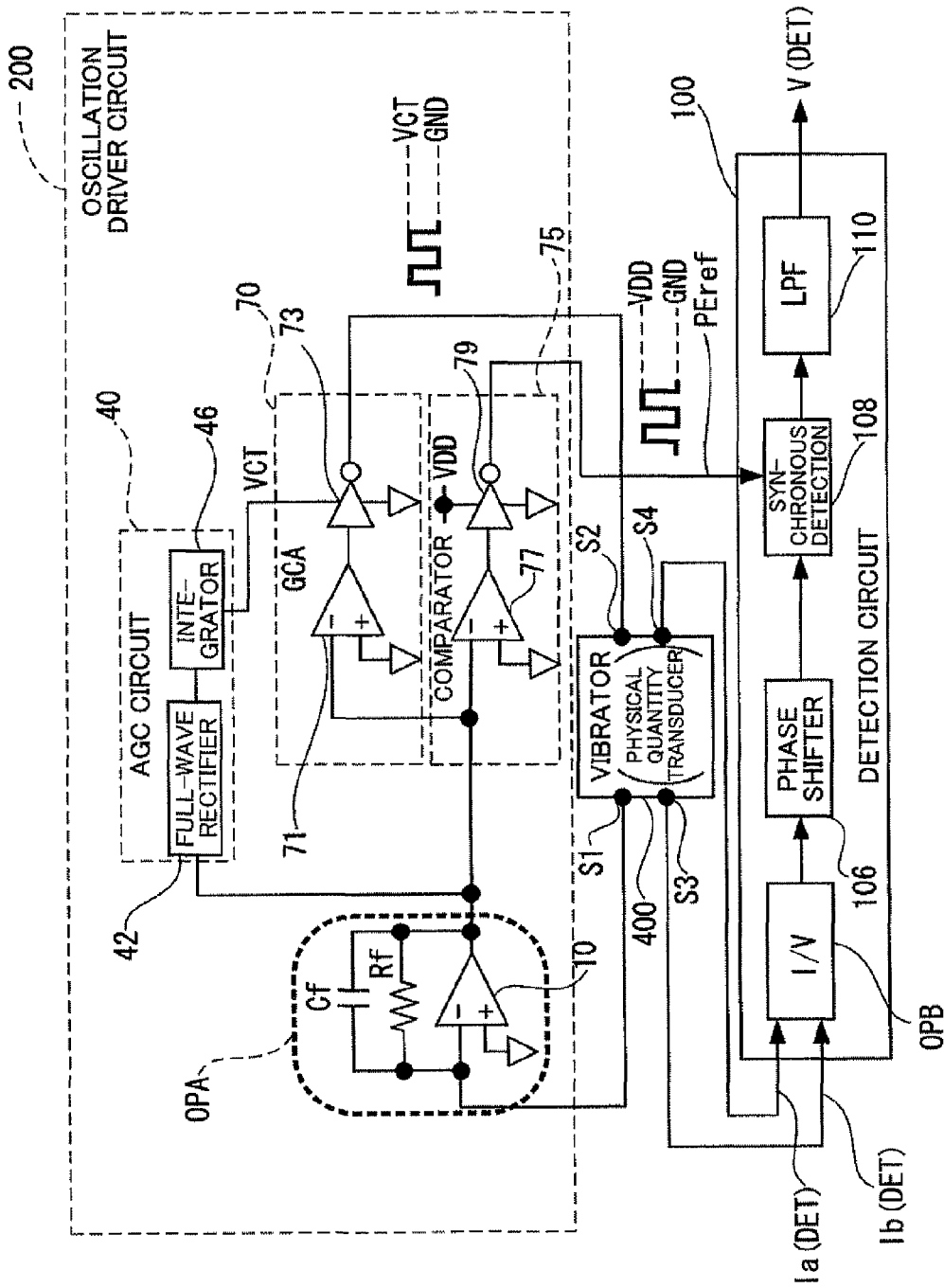
FIG. 2 is a circuit diagram showing the configuration of a comparative example (which is a circuit studied by the inventor of the invention before completion of the invention, but does not mean a related-art example) of the physical quantity measurement device according to the invention shown in FIG. 1.

FIG. 2 shows the configuration of a comparative example. FIG. 2 is a circuit diagram showing the configuration of a comparative example (which is a circuit studied by the inventor of the invention before completion of the invention, but does not mean a related-art example) of the physical quantity measurement device according to the invention shown in FIG. 1. In FIG. 2, the same sections as in FIG. 1 are basically indicated by the same reference symbols.

In the comparative example shown in FIG. 2, a gain control amplifier (GCA) 70 and a comparator 75 that generates the synchronous detection reference signal (PEref) are provided in parallel.

The gain control amplifier (GCA) 70 includes a differential section 71 and an output section 73 of which the output amplitude can be variably adjusted. The comparator 75 includes a differential section 77 and an output section 79 of which the output amplitude is constant (fixed).

The oscillation driver circuit 200 shown in FIG. 1 and the oscillation driver circuit 200 shown in FIG. 2 have the following difference. Specifically, the differential section 51 is shared in the oscillation driver circuit 200 shown in FIG. 1. The oscillation driver circuit 200 shown in FIG. 1 includes the first and second output sections (53 and 63) that receive the signal output from the shared differential section 51. In the circuit shown in FIG. 2, the gain control amplifier (GCA) 70 and the comparator 75 that generates the synchronous detection reference signal (PEref) are provided in parallel. In the circuit shown in FIG. 1, these two functional blocks are integrated in the composite comparator 50.

The area and the power consumption of the differential stage can be approximately halved by sharing the differential section (differential circuit) 51. Therefore, the size of the oscillation driver circuit 200 can be reduced. Since a considerable amount of current is required as the operating current of the differential stage in order to increase accuracy, power consumption can be reduced to a large extent by sharing the differential section.

Moreover, since the phase of the oscillation drive signal in the oscillation loop coincides with the phase of the synchronous detection reference signal (synchronization clock signal) by sharing the circuit, the detection accuracy of the physical quantity measurement device is improved due to the minimum phase shift.

The differential section can be shared in the oscillation driver circuit 200 shown in FIG. 1 for the following reasons. Specifically, the oscillation driver circuit 200 shown in FIG. 1 drives the physical quantity transducer using a rectangular wave. This method utilizes a phenomenon in which unnecessary harmonics are reduced due to the frequency filtering effect of the physical quantity transducer 400 even when driving the physical quantity transducer using a rectangular wave with a given frequency (including third-order and fifth-order harmonic components) so that a drive signal with a desired frequency (resonance frequency) is obtained.

When driving the physical quantity transducer 400 using a rectangular wave, it suffices that the gain control amplifier (GCA) 70 adjust the amplitude of the rectangular-wave drive signal. On the other hand, the synchronous detection reference signal can be generated based on the rectangular-wave drive signal (e.g., a rectangular wave that swings to the maximum between the power supply voltages in synchronization with the drive signal can be generated). Specifically, these operations are performed based on the rectangular-wave drive signal, and merely differ as to the process relating to the amplitude of the rectangular-wave drive signal. Therefore, these operations can be implemented by the one-input/two-output comparator.

Specifically, the differential section 51 (differential circuit that determines whether to output a signal set at the H level or the L level) that compares the drive signal (input voltage signal Vin) with a given voltage (VR0) is shared, and the first and second output sections (53 and 63) that receive the signal output from the shared differential section 51 are provided. The function of the gain control amplifier (GCA) 70 is implemented by allowing the voltage amplitude of the signal output from the first output section 53 to be variably adjusted based on the gain control signal (VCT) from the AGC circuit 40.

On the other hand, the voltage amplitude of the signal (i.e., the synchronous detection reference signal PEref) output from the second output section 63 is made constant (fixed) (e.g., allowed to swing to the maximum between the power supply voltages (VDD and GND)).

The differential-stage circuit area can be approximately halved as compared with FIG. 2 by sharing the differential section 51. Moreover, power consumption can be reduced. Since a considerable amount of current is required as the operating current of the differential section in order to increase accuracy, power consumption can be reduced to a large extent by sharing the differential section.

The operation of the detection circuit 100 shown in FIG. 1 is described below. An oscillation loop including the oscillation driver circuit 200 is formed during normal operation. The physical quantity transducer (vibrator) 400 produces driving vibrations in a specific direction due to the oscillation loop. The oscillation drive frequency is referred to as "fd".

When the physical quantity transducer 400 has rotated, alternating current signals (Ia(DET) and Ib(DET)) are generated corresponding to the Coriolis force that occurs perpendicularly to the driving vibrations due to rotation. The alternating current signals (Ia(DET) and Ib(DET)) are input to the first-stage current/voltage conversion amplifier circuit (OPB) of the detection circuit 10.

A driving vibration leakage component (unnecessary signal) is superimposed on the alternating current signals (Ia(DET) and Ib(DET)). Since the alternating current signals (Ia(DET) and Ib(DET)) occur perpendicularly to the driving vibrations, the phase of the alternating current signals (Ia(DET) and Ib(DET)) differs from the phase of the unnecessary signal (driving vibration component) by 90 degrees (the alternating current signals and the unnecessary signal have a drive frequency fd).

The synchronous detection circuit 108 performs a synchronous detection process in order to remove the unnecessary component. The synchronous detection process is performed in synchronization with the synchronous detection reference signal (REref) output from the oscillation driver circuit 200.

The synchronous detection process is performed under conditions whereby the frequency (fd) of the synchronous detection reference signal (REref) is equal to the frequency (fd) of the alternating current signals (Ia(DET) and Ib(DET)) input to the detection circuit 100, the phase of the synchronous detection reference signal (REref) is synchronized with the phase of the alternating current signals (Ia(DET) and Ib(DET)), and the phase of the unnecessary signal (driving vibration leakage component) to be removed differs from the phase of the synchronous detection reference signal (REref) by 90 degrees.

The phase shifter 106 of the detection circuit 100 rotates the phase of the signal output from the detection current/voltage conversion amplifier circuit (OPA) by given degrees so that the above-mentioned phase conditions are satisfied (note that this phase shift process is not indispensable). The phase shifter 106 also rotates the phase of the signal having a frequency fd from the first-stage current/voltage conversion amplifier circuit (OPB) by given degrees, if necessary. The oscillation driver circuit 200 also rotates the phase of the signal having a frequency fd from the first-stage drive current/voltage conversion amplifier circuit (OPA) by given degrees, if necessary.

When the synchronous detection circuit 108 has performed the synchronous detection process, the desired signal (detection signal component) appears in the direct-current frequency band and the 2fd frequency band (fd refers to the frequency of the synchronous detection reference signal (REref)) (upper side band and lower side band), and the unnecessary signal (driving vibration leakage component) appears in the 2fd frequency band. Therefore, the desired detection signal VDET (direct current) can be obtained by removing the component in the 2fd frequency band using the low-pass filter 110.

Figure 3A:
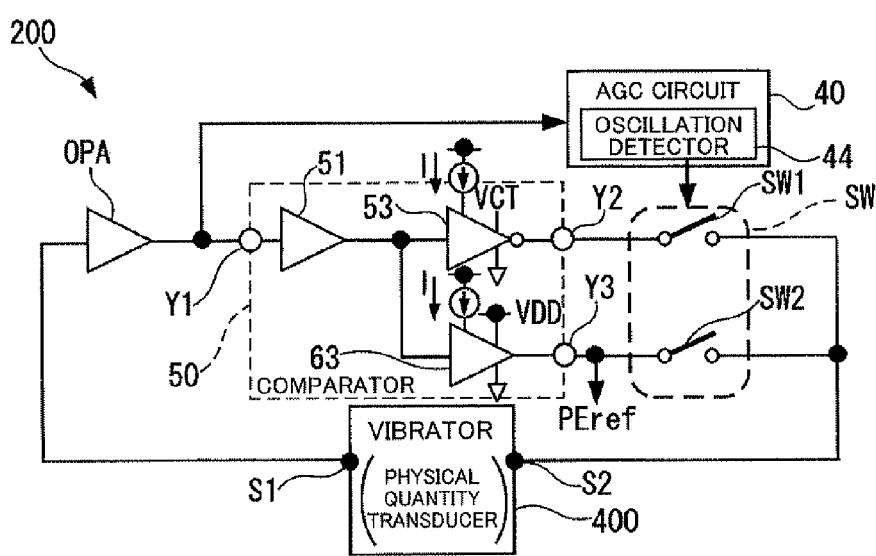
FIGS. 3A to 3C are views illustrative of a reduction in oscillation startup time and measures against overcurrent due to a change in oscillation loop employed in an oscillation driver circuit according to the invention.
Figure 3B:
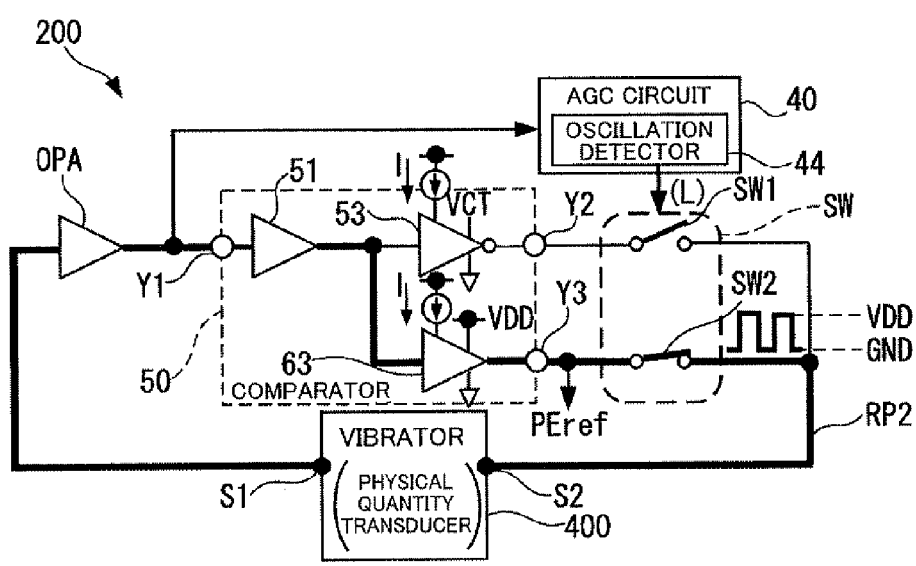
Figure 3C:
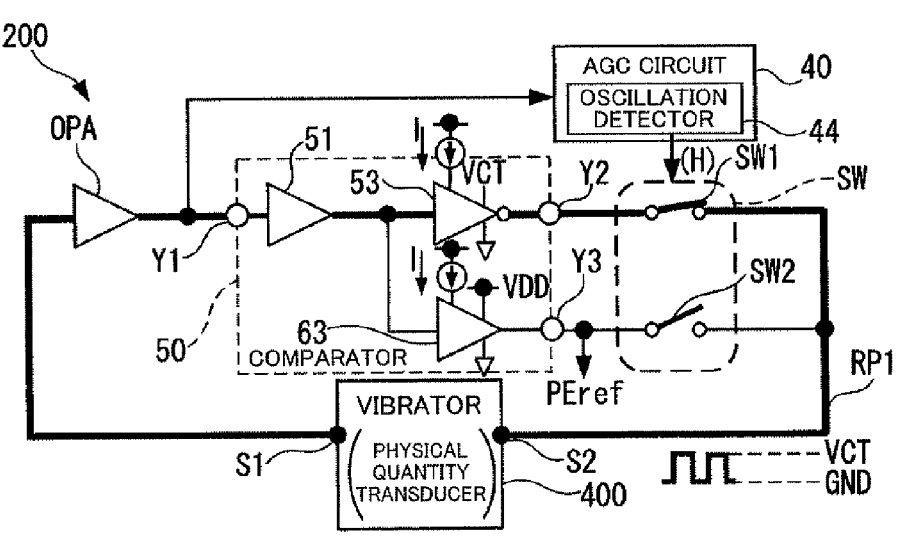

Reduction in oscillation startup time and measures against overcurrent due to change in oscillation loop FIGS. 3A to 3C are views illustrative of a reduction in oscillation startup time and measures against overcurrent due to a change in oscillation loop employed in the oscillation driver circuit according to the invention.

In the oscillation driver circuit 200 shown in FIG. 1, the signal output from the second output section 63 is merely utilized as the synchronous detection reference signal (PEref). The oscillation driver circuit 230 shown in FIGS. 3A to 3C is configured so that a second oscillation loop (RP2) including the second output section 63 can also be formed. The physical quantity transducer 400 is caused to oscillate during oscillation startup while setting the loop gain to be larger than unity through the second oscillation loop (RP2). This accelerates a transition from oscillation startup to the steady oscillation state.

As shown in FIG. 3A, a switch circuit SW including first and second loop switches (SW1 and SW2) is provided in order to switch between the first oscillation loop (i.e., the oscillation loop including the output section 53) RP1 and the second oscillation loop RP2.

The first and second loop switches (SW1 and SW2) of the switch circuit SW are complementarily turned ON/OFF based on an oscillation detection signal from an oscillation detector 44 provided in the AGC circuit 40.

As shown in FIG. 3B, the second oscillation loop RP2 (indicated by a bold solid line in FIG. 3B) is selected during oscillation startup (i.e., a transitional state before a transition to the steady oscillation state occurs). Since the voltage amplitude of the signal output from the second output section 63 swings to the maximum between the power supply voltages, the gain in the second oscillation loop is equal to or larger than unity.

As shown in FIG. 3C, the first oscillation loop RP1 (indicated by a bold solid line in FIG. 3C) is selected during the steady oscillation state. The loop gain in the first oscillation loop RP1 is controlled to be unity by the AGC circuit 40.

Since the oscillation driver circuit 200 shown in FIGS. 3A to 3C has the second oscillation loop RP2 of which the loop gain is set to be larger than unity, a transition from oscillation startup to the steady oscillation state can be accelerated. This makes it possible to cause the physical quantity transducer 400 to oscillate quickly.

Since the first and second loop switches (SW1 and SW2) are ON/OFF-controlled using the oscillation detector 44 included in the automatic gain control circuit (AGC circuit) 40, the first and second loop switches (SW1 and SW2) can be ON/OFF-controlled without providing an additional circuit. As shown in FIG. 1, the AGC circuit 40 includes the full-wave rectifier 42 that rectifies a signal in the oscillation loop and the integrator (integration circuit) (circuit that detects a direct current level) 46. The oscillation state can be detected by monitoring the direct current level. Therefore, the oscillation loop can be switched between the first and second oscillation loops (RP1 and RP2) corresponding to the loop state based on the oscillation detection signal from the oscillation detector 44 provided in the AGC circuit 40.

In FIGS. 3A to 3C, a power supply current I that flows through the second output section 53 (and the first output section 63) is limited to a constant level using a constant current source. This prevents a situation in which the physical quantity transducer 400 breaks down due to an overcurrent during driving (measures against overcurrent).

In particular, since the gain in the second oscillation loop (RP2) that passes through the second output section 63 is larger than unity, an overcurrent may flow through the physical quantity transducer (e.g., crystal vibrator or piezoelectric element) 400 due to an increase in voltage amplitude of the oscillation drive signal. In this case, the vibrating portion of the physical quantity transducer 400 may break down, for example. Therefore, a situation in which an overcurrent flows through the physical quantity transducer 400 is prevented by providing a current limiter circuit that limits the current capability of the second output section 63 (and the first output section 53) (i.e., a circuit that limits a current that flows through the output node Y3 (Y2) using a constant current source).

The output current from the second output section 63 may be limited by limiting the amount of current that flows through at least either a current path that connects the high-potential-side power supply node and the second output node (Y3) or a current path that connects the low-potential-side power supply node and the second output node.

A situation in which the physical quantity transducer 400 breaks down due to an overcurrent can be effectively prevented by simply modifying the circuit. This improves the reliability of the physical quantity measurement device (including the oscillation driver circuit).

Low Power Consumption Mode (Sleep Mode)

Figure 4:
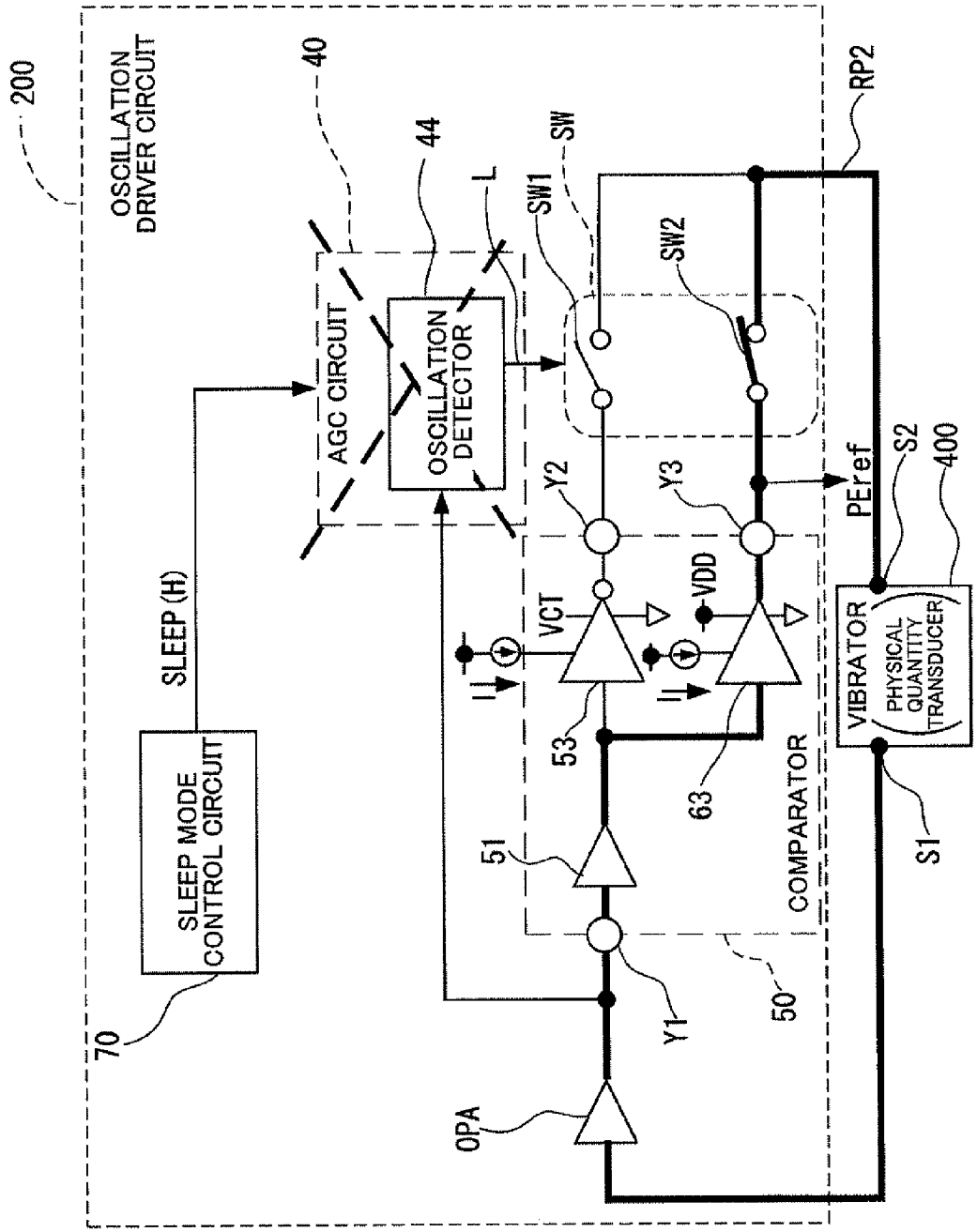
FIG. 4 is a circuit diagram showing the configuration of an oscillation driver circuit which can be set in a low power consumption mode.

FIG. 4 is a circuit diagram showing the configuration of an oscillation driver circuit which can be set in a low power consumption mode. The oscillation driver circuit 200 shown in FIG. 4 includes a sleep mode control circuit 700 in addition in the configuration of the oscillation driver circuit shown in FIGS. 3A to 3C.

The low power consumption mode (hereinafter referred to as "sleep mode"; may be referred to as "standby mode") is utilized as follows. For example, when the physical quantity measurement device is used for camera image stabilization, the oscillation driver circuit is partially set in a non-operating state when a release switch is not pressed for several seconds (i.e., photographing is suspended) to reduce power consumption.

In the oscillation driver circuit shown in FIG. 4, the AGC circuit 40 is set in a non-operating (off) state when a sleep control signal (SLEEP) from the sleep mode control circuit 700 has changed from the L level to the H level, for example. In FIG. 4, a dotted cross mark indicates that the AGC circuit 40 is turned OFF.

According to the circuit configuration shown in FIG. 4, power consumption can be further reduced using the sleep mode in addition to sharing the differential section.

It is important to enable a quick recovery of (transition to) the normal operation mode when using the sleep mode (particularly when using a crystal vibrator). When the oscillation loop is stopped during the sleep mode, it takes time to implement the steady oscillation state during the subsequent oscillation startup.

According to the oscillation driver circuit 200 shown in FIG. 4, in order to enable a quick transition to the normal operation mode (i.e., a mode in which a physical quantity such as an angular velocity is detected), the second loop switch SW2 is turned ON during the sleep mode so that the physical quantity transducer 400 is caused to oscillate while setting the gain in the second oscillation loop RP2 (indicated by a bold solid line in FIG. 4) to be larger than unity.

Therefore, an oscillation state similar to that during oscillation startup is maintained during the sleep mode. This enables a quick transition to the steady oscillation state.

Figure 5:
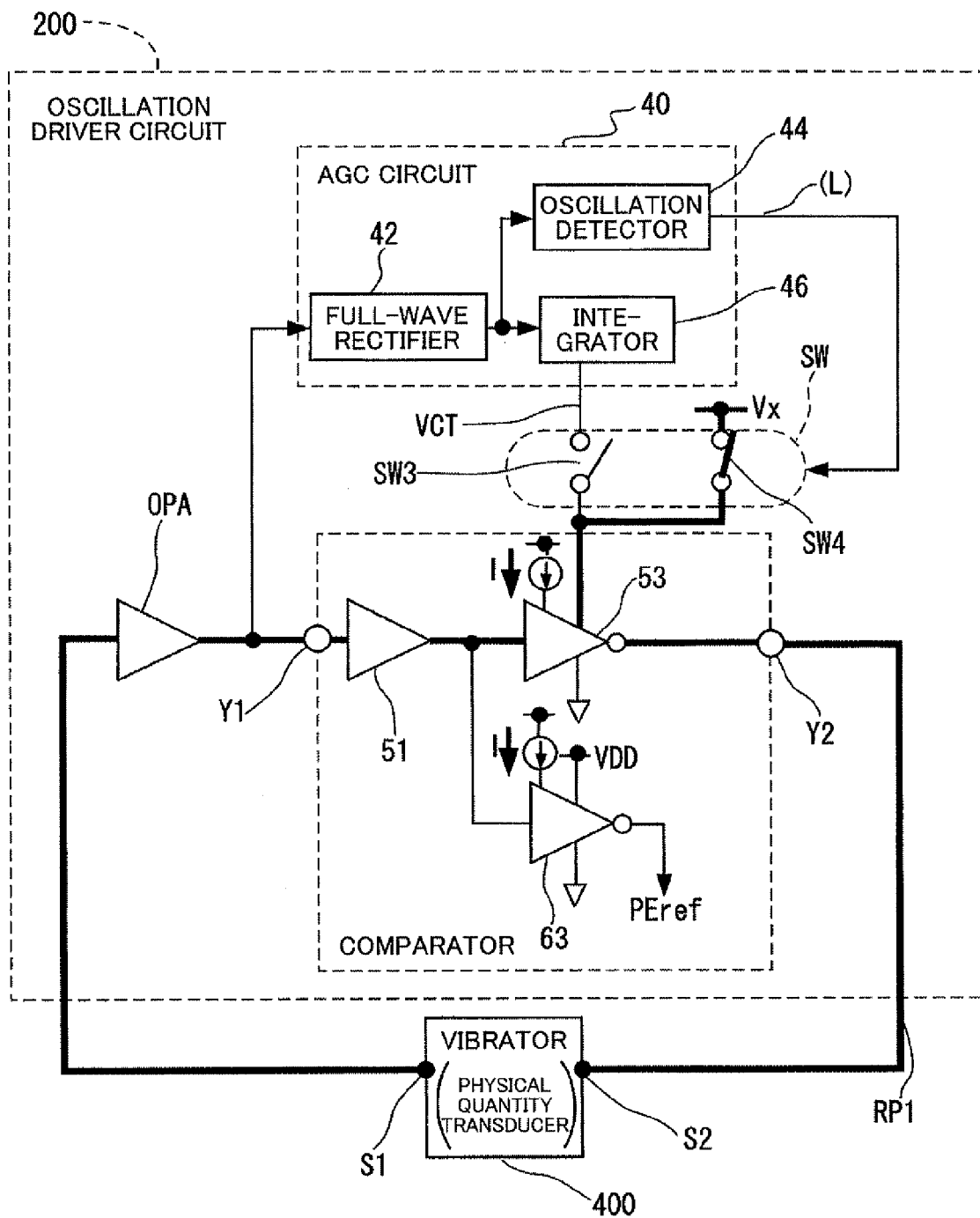
FIG. 5 is a circuit diagram showing another embodiment (i.e., the voltage amplitude of a first output section is changed based on an oscillation state or an operation mode) of the oscillation driver circuit.

Embodiment in which voltage amplitude of first output section is changed based on oscillation state or operation mode while providing one oscillation loop FIG. 5 is a circuit diagram showing another embodiment (i.e., the voltage amplitude of the first output section is changed based on the oscillation state or the operation mode) of the oscillation driver circuit.

In FIGS. 3A to 3C and 4, the oscillation loop is switched between the first and second oscillation loops (RP1 and RP2) corresponding to oscillation startup and the steady oscillation state. In this embodiment, only one oscillation loop (i.e., the oscillation loop including the first output section) is provided.

On the other hand, the voltage amplitude of the signal output from the first output section 53 is changed corresponding to oscillation startup and the steady oscillation state. Specifically, a quick transition to the steady oscillation state can be achieved by setting the gain in the oscillation loop to be larger than unity during oscillation startup.

In order to enable such an operation, the oscillation driver circuit 200 shown in FIG. 5 includes a first power supply voltage switch (SW3) that supplies a first power supply voltage (VCT) that adjusts the gain in the oscillation loop to unity to a high-potential-side power supply node of the first output section 53, and a second power supply voltage switch (SW4) that supplies a second power supply voltage (Vx) that adjusts the gain in the oscillation loop to be larger than unity to the high-potential-side power supply node of the first output section 53.

The first and second power supply voltage switches (SW3 and SW4) are complementarily turned ON based on the oscillation detection signal output from the oscillation detector 44 provided in the AGC circuit 40. Specifically, the first power supply voltage switch SW3 is turned ON during the steady oscillation state, and the second power supply voltage switch SW4 is turned ON during oscillation startup, FIG. 5 shows a state during oscillation startup. Specifically, the second power supply voltage switch SW4 is turned ON so that the physical quantity transducer 400 is caused to oscillate while setting the gain in the first oscillation loop RP1 to be larger than unity. In FIG. 5, a path used during oscillation startup is indicated by a bold solid line.

The embodiment shown in FIG. 5 enables a quick transition from oscillation startup to the steady oscillation state in the same manner as in FIGS. 3A to 3C and 4.

The oscillation driver circuit 200 shown in FIG. 5 is provided with measures against overcurrent in the same manner as in FIGS. 3A to 3C and 4.

Specifically, when the oscillation driver circuit shown in FIG. 5 has set the gain in the oscillation loop to be larger than unity by increasing the voltage amplitude of the signal output from the first output section 53 during oscillation startup, an overcurrent may flow through the physical quantity transducer (e.g., crystal vibrator or piezoelectric element), whereby the vibrator of the physical quantity transducer may break down, for example.

Therefore, a current limiter circuit that limits the current capability of the first output section 53 (i.e., a constant current circuit that makes an output-stage power supply current constant) is provided. This effectively prevents a situation in which the physical quantity transducer breaks down due to an overcurrent by simply modifying the circuit.

The output current from the first output section 53 may be limited by limiting the amount of current that flows through at least either a current path that connects the high-potential-side power supply node and the first output node (Y2) or a current path that connects the low-potential-side power supply node and the first output node (Y2).

A situation in which the physical quantity transducer 400 breaks down due to an overcurrent can be effectively prevented by simply modifying the circuit in this manner. This improves the reliability of the physical quantity measurement device (including the oscillation driver circuit).

Embodiment in which sleep mode is utilized in circuit configuration shown in FIG. 5

Figure 6:
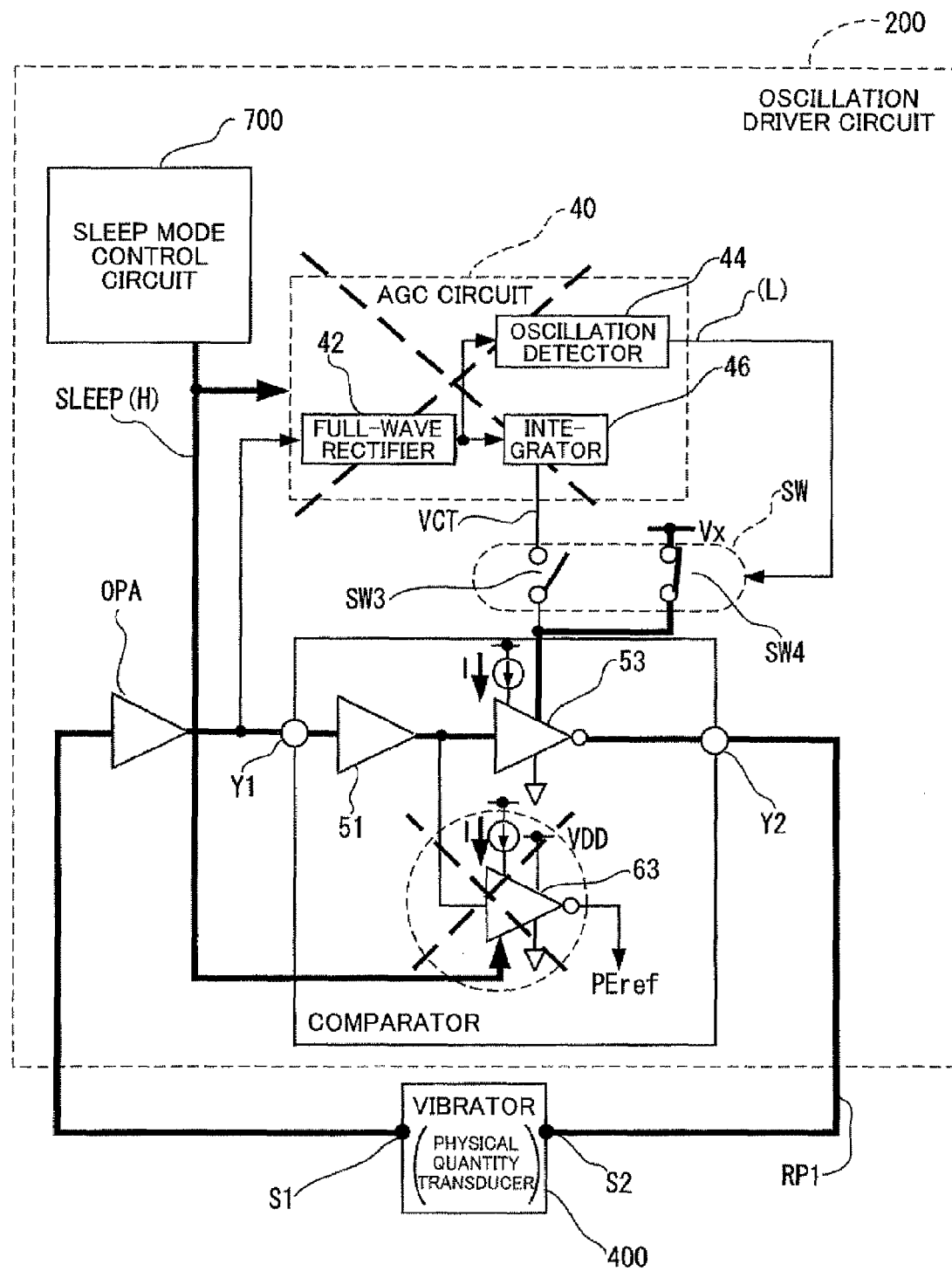
FIG. 6 is a circuit diagram showing another embodiment (utilizing a sleep mode) of the oscillation driver circuit.

FIG. 6 is a circuit diagram showing another embodiment (i.e., a sleep mode is utilized in the circuit shown in FIG. 5) of the oscillation driver circuit.

The oscillation driver circuit 200 shown in FIG. 6 can be set in a sleep mode in which the operations of unnecessary circuits are stopped (OFF) in order to reduce the power consumption of the oscillation driver circuit 200. Specifically, the oscillation driver circuit 200 shown in FIG. 6 includes the sleep mode control circuit 700. When the sleep control signal (SLEEP) has changed from the L level to the H level, the AGC circuit 40 and the second output section (output circuit) 63 are turned OFF. Therefore, power consumption can be further reduced in addition to sharing the differential section 51.

In particular, since generation of the synchronous detection reference signal (PEref) is stopped when the second output section (output circuit) 63 is turned OFF, the operation of the synchronous detection circuit 108 (see FIG. 1) automatically stops. Therefore, power consumption can be further reduced.

According to the oscillation driver circuit 200 shown in FIG. 6, in order to enable a quick transition to the normal operation mode (i.e., a mode in which a physical quantity such as an angular velocity is detected), the physical quantity transducer is caused to oscillate during the sleep mode while setting the gain in the oscillation loop to be larger than unity by increasing the voltage amplitude of the first output section 53. In FIG. 6, a path used during the sleep mode is indicated by a bold solid line.

Therefore, an oscillation state similar to that during oscillation startup is maintained during the sleep mode. As a result, a quick transition to the steady oscillation state can be achieved.

Second Embodiment

This embodiment illustrates a specific circuit configuration example of the composite comparator (two-stage-output comparator with shared differential section) 51.

Specific Circuit Configuration Example of Composite Comparator

Figure 7:
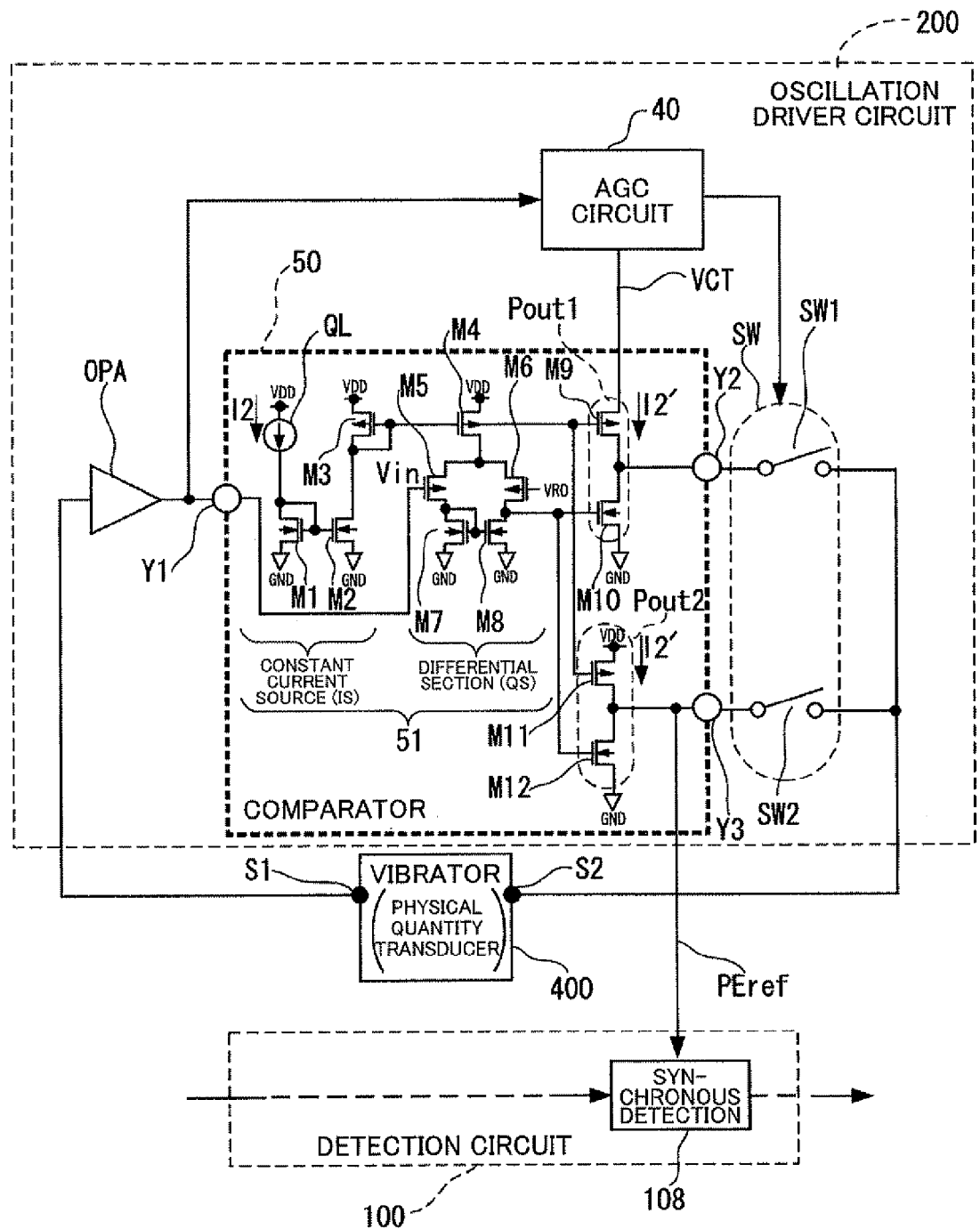
FIG. 7 is a circuit diagram showing an example of a specific circuit configuration of a composite comparator.

FIG. 7 is a circuit diagram showing an example of a specific circuit configuration of the composite comparator. As shown in FIG. 7, the comparator 51 includes a constant current source IS, a differential section (differential circuit) QS (reference numeral 51 in FIGS. 1 to 6), and first and second output sections (Pout1 and Pout2: reference numerals 53 and 63 in FIGS. 1 to 6).

The constant current source IS includes a constant current circuit (QL) that generates a constant current I2, NMOS transistors (M1 and M2), and a PMOS transistor (M3). The NMOS transistors (M1 and M2) form a current mirror.

The differential section (QS) includes a PMOS transistor M4 that supplies an operating current, differential-pair transistors (M5 and M6), and load transistors (M7 and M8) that form a current mirror.

The differential section (QS) compares the voltage signal Vin output from the drive current/voltage conversion amplifier circuit (OPA) with the reference voltage (VR0), and outputs a signal set at the H level or the L level corresponding to the comparison result.

The first output section (Pout1 reference numeral 53 in FIG. 1) includes a PMOS transistor M9 to which the gain control signal (VCT) from the AGC circuit 40 is supplied as a high-potential-side power supply voltage, and an NMOS transistor M10 that receives a single-ended output from the differential section (QS).

The voltage amplitude of the signal output from the first output section (Pout1) is adjusted based on the gain control signal (VCT) from the AGC circuit 40 so that the loop gain is adjusted to unity during the steady oscillation state.

Likewise, the second output section (Pout2: reference numeral 63 in FIG. 1) includes a PMOS transistor M11, the power supply voltage (VDD) of the oscillation driver circuit 200 being supplied to the source of the PMOS transistor M11, and an NMOS transistor M12 that receives the single-ended output from the differential section (QS). The voltage amplitude of the signal output from the second output section (Pout2) is constant (fixed). The signal output from the second output section (Pout2) serves as the synchronous detection reference signal (PEref).

The PMOS transistor M3 of the constant current source (IS) forms a current mirror with the PMOS transistor M4 that supplies an operating current of the differential section (QS), the PMOS transistor M9 of the first output section (Pout1), and the PMOS transistor M11 of the second output section (Pout2).

The operating current (bias current) of the first and second output sections (Pout1 and Pout2) is a current I2' generated based on the current I2 generated by the constant current source (IS) (I2=I2' when the current mirror ratio is 1:1). This limits the amount of current which may be supplied to the physical quantity transducer 400. Therefore, the physical quantity transducer 400 does not break down due to an overcurrent.

Figure 8:
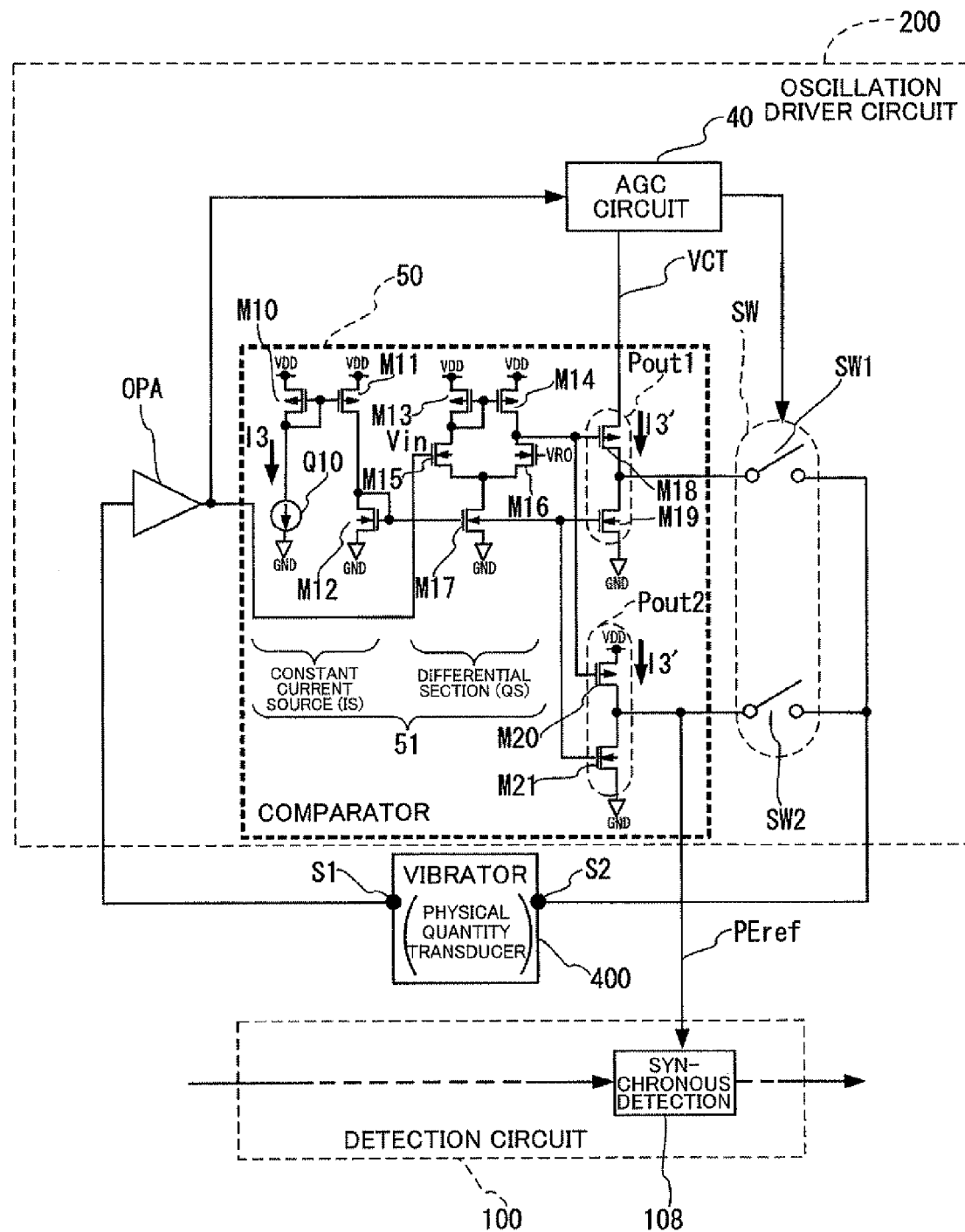
FIG. 8 is a circuit diagram showing another example of a specific circuit configuration of a composite comparator.

FIG. 8 is a circuit diagram showing another example of a specific circuit configuration of the composite comparator. The transistor of the circuit shown in FIG. 8 has a conductivity type which is the reverse of that of the circuit shown in FIG. 7. The operation of the circuit shown in FIG. 8 is substantially the same as that of the circuit shown in FIG. 7.

Third Embodiment

Figure 9:
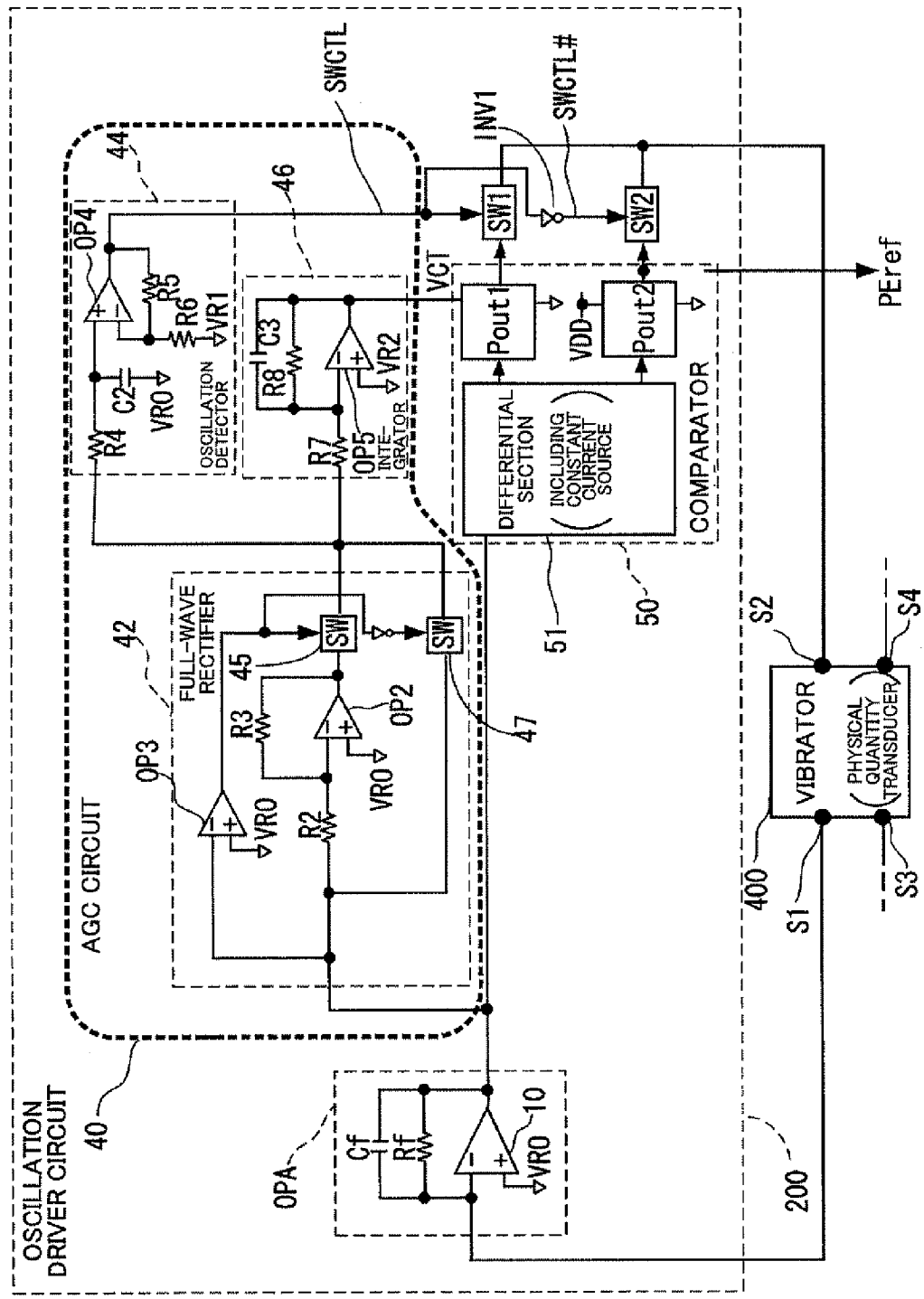
FIG. 9 is a circuit diagram showing a specific circuit configuration of an example of an AGC circuit.

This embodiment illustrates a specific configuration example of the AGC circuit 40. FIG. 9 is a circuit diagram showing a specific circuit configuration of an example of the AGC circuit.

As shown in FIG. 9, the AGC circuit 40 includes the full-wave rectifier 42, the oscillation detector 44, and the integrator 46.

The full-wave rectifier 42 subjects the alternating-current voltage signal from the current/voltage conversion amplifier circuit (OPA) to full-wave rectification to obtain a voltage having only a positive waveform, for example. The full-wave rectifier 42 includes an operational amplifier (OP2) that includes an input resistor R2 and a feedback resistor R3, switches (45 and 47) that are complementarily turned ON, and a comparator (OP3) that causes the switches (45 and 47) to be turned ON/OFF.

The integrator 46 generates the gain control signal (VCT) for controlling the gain in the oscillation loop based on an integration result for the voltage value converted by the full-wave rectifier 42.

The integrator 46 includes an input resistor R7, a feedback resistor R8, a feedback capacitor C3, and an operational amplifier (OP5). The integrator 46 integrates the voltage value converted by the full-wave rectifier 42 to determine the voltage level of the direct-current component, compares the voltage level with a given reference signal level (VR0), and generates the gain control signal (VCT) based on the comparison result. The gain control signal (VCT) serves as the high-potential-side power supply voltage of the first output section 53 of the composite comparator 50 (note that the invention is not limited to this configuration).

The oscillation detector 44 includes an input-stage low-pass filter (R4 and C2), and an operational amplifier (OP4) that includes feedback resistors (R5 and R6). The oscillation detector 44 smooths the voltage value converted by the full-wave rectifier 42 using the low-pass filter to obtain a direct-current voltage, and compares the level of the direct-current voltage with a given value (Vref=VDD·{R6/(R5+R6)}). The oscillation detector 44 determines that the oscillation loop including the physical quantity transducer 400 is in an oscillation state when the level of the direct-current voltage is larger than the given value. The oscillation detector 44 outputs a switch control signal SWCTL corresponding to the comparison result.

The first and second loop switches (SW1 and SW2; see FIGS. 3A to 3C and 4) are ON/OFF-controlled based on the switch control signal SWCTL and a switch control signal SWCTL# obtained by reversing the level of the switch control signal SWCTL using an inverter (INV1).

Fourth Embodiment

This embodiment illustrates a specific circuit configuration and an operation example of the oscillation driver circuit (and the physical quantity measurement device) using the method that switches the oscillation loop between the first and second oscillation loops (i.e., the method shown in FIGS. 3A to 3C and 4) with reference to FIGS. 10 to 13.

Figure 10:
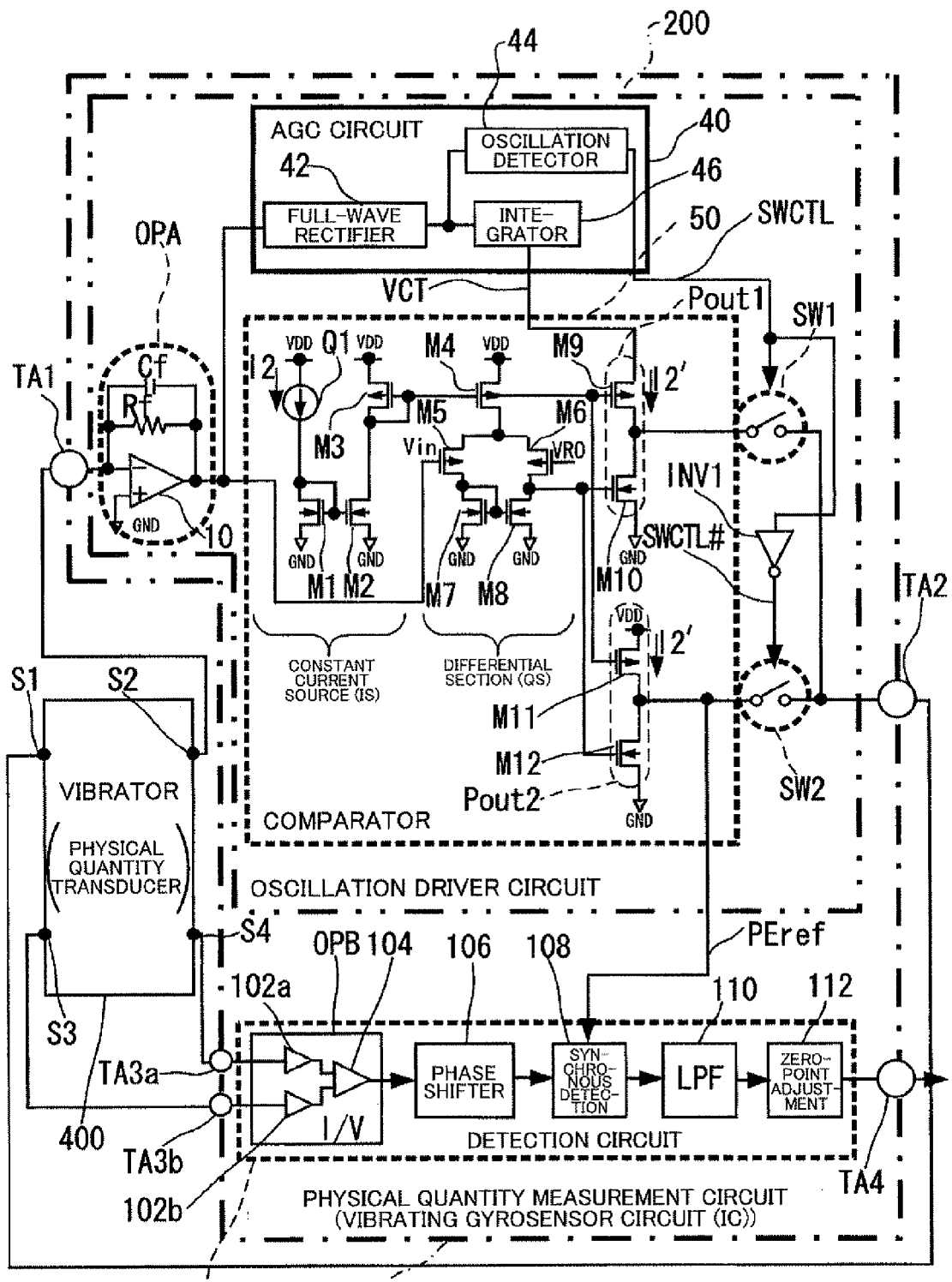
FIG. 10 is a circuit diagram showing a specific circuit configuration of an oscillation driver circuit (and a physical quantity measurement device) using a method that switches an oscillation loop between first and second oscillation loops.
Figure 11:
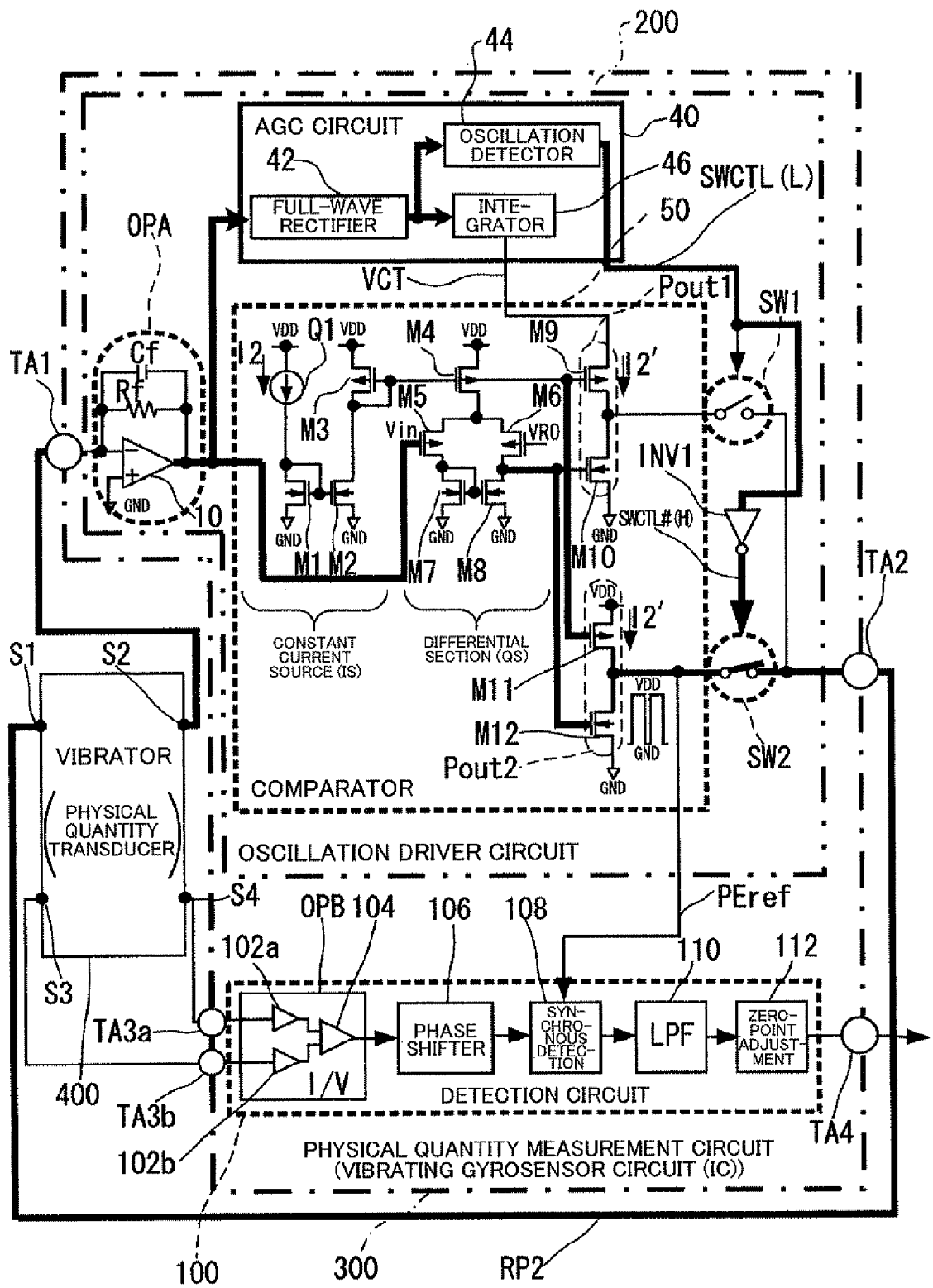
FIG. 11 is a circuit diagram showing a specific operation of the oscillation driver circuit shown in FIG. 10 during oscillation startup.
Figure 12:
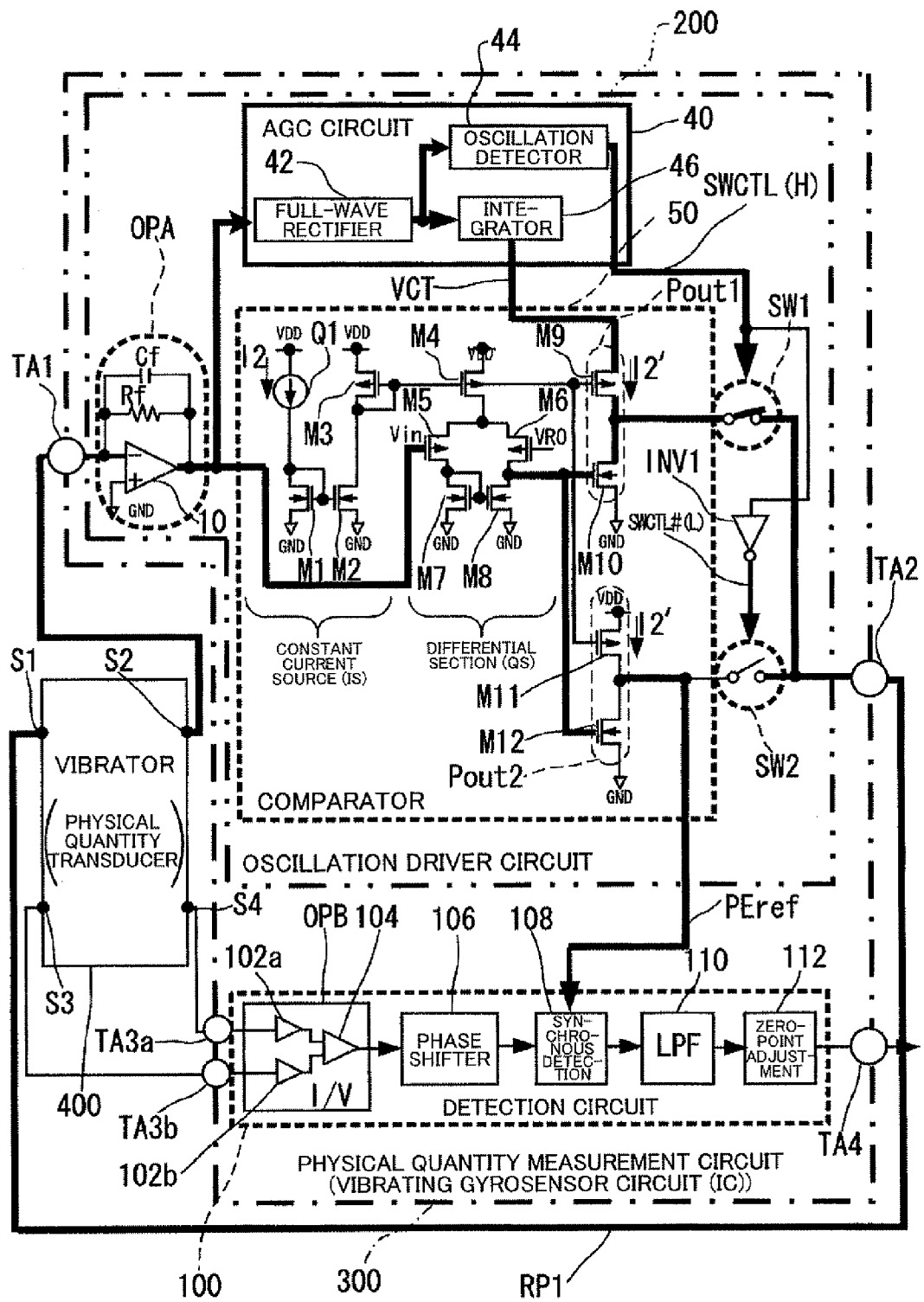
FIG. 12 is a circuit diagram showing a specific operation of the oscillation driver circuit shown in FIG. 10 during a steady oscillation state.
Figure 13:
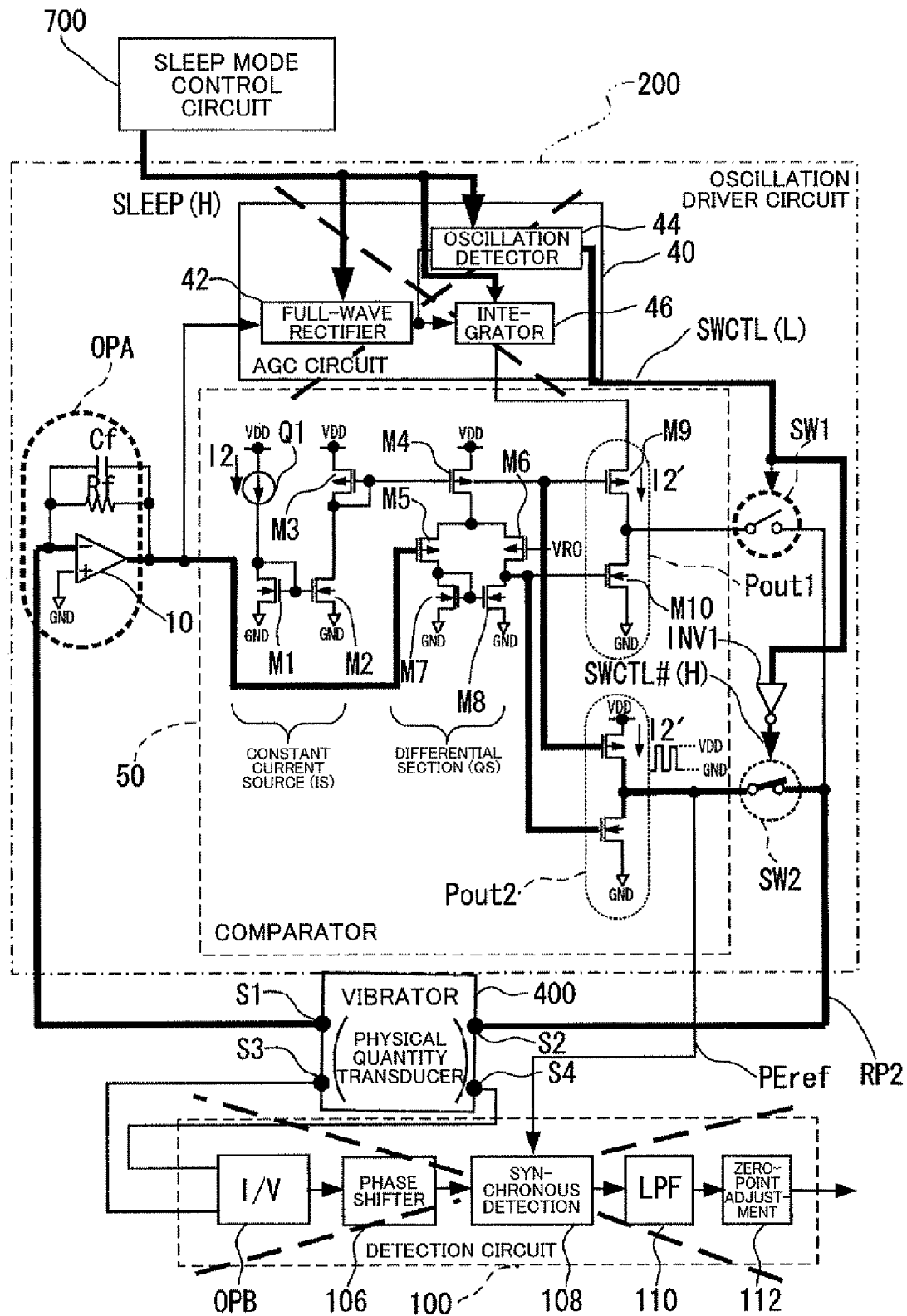
FIG. 13 is a circuit diagram showing a specific operation of the oscillation driver circuit shown in FIG. 10 during a sleep mode.

FIG. 10 is a circuit diagram showing a specific circuit configuration of the oscillation driver circuit (and the physical quantity measurement device) using the method that switches the oscillation loop between the first and second oscillation loops. FIG. 11 is a circuit diagram showing a specific operation of the oscillation driver circuit shown in FIG. 10 during oscillation startup. FIG. 12 is a circuit diagram showing a specific operation of the oscillation driver circuit shown in FIG. 10 during the steady oscillation state. FIG. 13 is a circuit diagram showing a specific operation of the oscillation driver circuit shown in FIG. 10 during the sleep mode. In FIGS. 10 to 13, the same sections as in the above-described embodiments are indicated by the same reference symbols.

Note that this embodiment employs the circuit configuration shown in FIG. 7 as the configuration of the comparator 50.

Circuit Configuration

As shown in FIG. 10, a physical quantity measurement circuit (vibrating gyrosensor circuit: IC) is formed by integrating the oscillation driver circuit 200 that includes the comparator 50 and the detection circuit 100. The first-stage current/voltage conversion amplifier circuit (OPB) of the detection circuit 100 includes two current/voltage conversion amplifiers (102a and 102b) that receive detection signals of different polarities input through two detection terminals (TA3a and TA3b), and a differential amplifier 104. Noise in an identical phase can be canceled using a differential configuration so that the S/N ratio is improved. The detection circuit 100 includes a zero-point adjustment circuit 112 provided in the subsequent stage of the low-pass filter (LPF) 110. The oscillation driver circuit 200 includes the first and second loop switches (SW1 and SW2).

Operation During Oscillation Startup

A path indicated by a bold solid line in FIG. 11 is utilized during oscillation startup, Specifically, the switch control signal (SWCTL) output from the oscillation detector 44 of the AGC circuit 40 is set at the L level so that the loop switch SW1 is turned OFF and the loop switch SW2 is turned ON, whereby the second oscillation loop (RP2: oscillation loop that passes through the second output section Pout2 of the comparator 50) is enabled (formed).

A rectangular-wave signal that swings to the maximum between the power supply voltages (i.e., the high-potential-side power supply voltage VDD and the power supply voltage GND) of the oscillation driver circuit 200 (the rectangular-wave signal serves as the synchronous detection reference signal PEref and also serves as the oscillation drive signal in the second oscillation loop RP2) is output from the second output section Pout2 of the comparator 50. The loop gain in the second oscillation loop RP2 is larger than unity. Since a necessary voltage amplitude oscillation waveform can be quickly obtained during oscillation startup (e.g., when power is supplied), a quick transition to the steady oscillation state can be achieved.

Operation During Steady Oscillation State

A path indicated by a bold solid line in FIG. 12 is utilized during the steady oscillation state. Specifically, the switch control signal (SWCTL) output from the oscillation detector 44 of the AGC circuit 40 is set at the H level so that the switch SW1 is turned ON and the switch SW2 is turned OFF, whereby the first oscillation loop (RP1: oscillation loop that passes through the first output section Pout1 of the comparator 50) is enabled (formed).

A rectangular-wave signal that swings between the gain control voltage VCT output from the AGC circuit 40 and the ground power supply voltage (GND) is output from the first output section Pout1 of the comparator 50. The loop gain in the first oscillation loop RP1 is negative-feedback-controlled to be unity.

Operation During Sleep Mode

A path indicated by a bold solid line in FIG. 13 is utilized during the sleep mode. Specifically, the sleep control signal (SLEEP) output from the sleep mode control circuit 700 is set at the H level (active level). This causes the AGC circuit 40 to be turned OFF. This enables a further reduction in power consumption. Since the detection circuit 100 need not operate during the sleep mode, the entire detection circuit 100 is turned OFF.

In this case, the switch control signal (SWCTL) output from the oscillation detector 44 of the AGC circuit 40 is necessarily set at the L level. This causes the first loop switch SW1 to be turned OFF and the second loop switch SW2 to be turned ON, whereby the second oscillation loop (RP2: oscillation loop that passes through the second output section Pout2 of the comparator 50) is enabled (formed) in the same manner as during oscillation startup.

A rectangular-wave signal that swings to the maximum between the power supply voltages (i.e., the high-potential-side power supply voltage VDD and the ground power supply voltage GND) of the oscillation driver circuit 200 is output from the second output section Pout2 of the comparator 50. The loop gain in the second oscillation loop RP2 is larger than unity Therefore, a quick transition to the normal operation mode can be achieved when the sleep mode is canceled.

Fifth Embodiment

Figure 14:
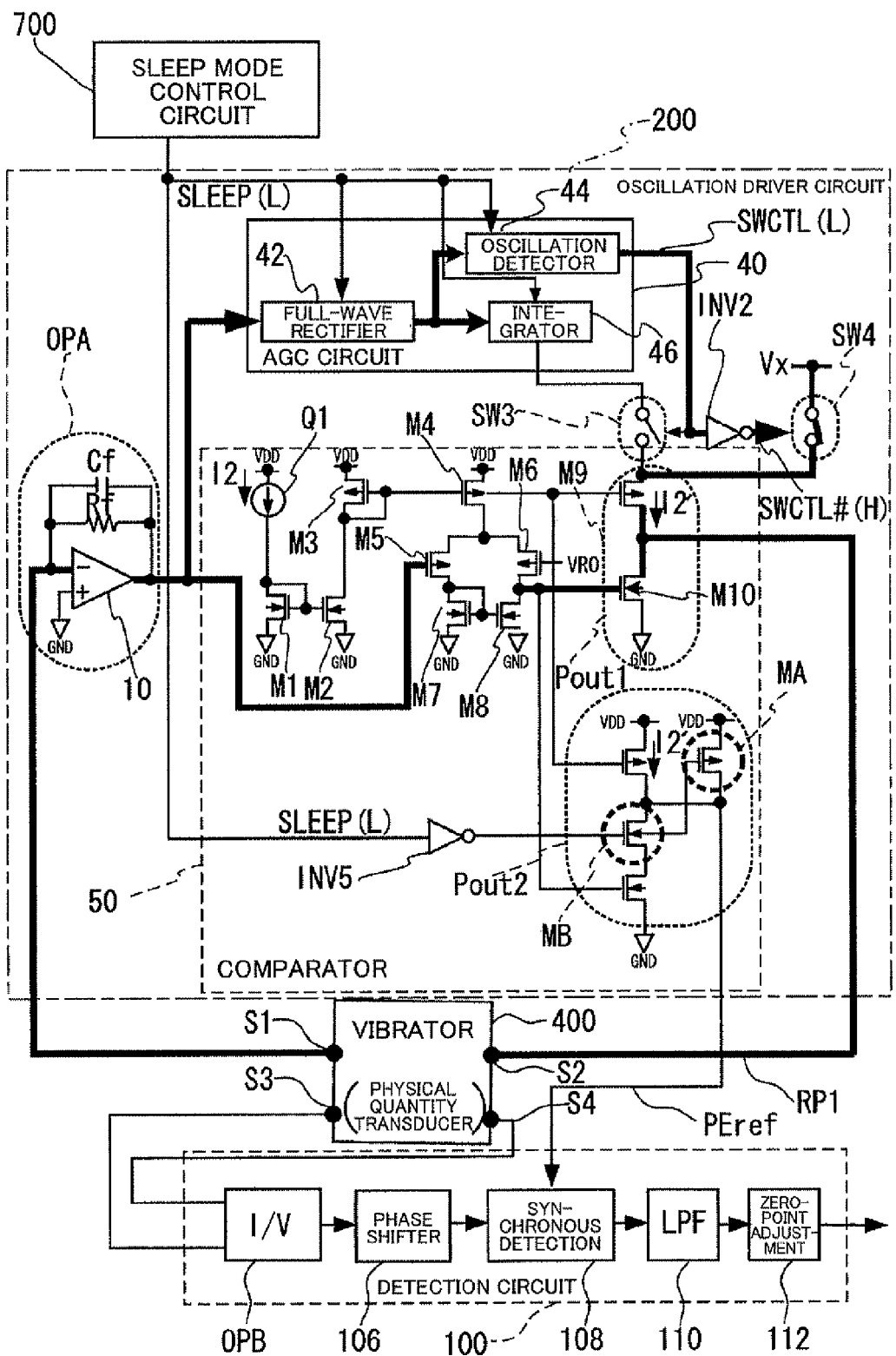
FIG. 14 is a circuit diagram showing a specific circuit configuration and an oscillation startup operation of an oscillation driver circuit (physical quantity measurement device) using a method that changes the voltage amplitude of a first output section.
Figure 15:
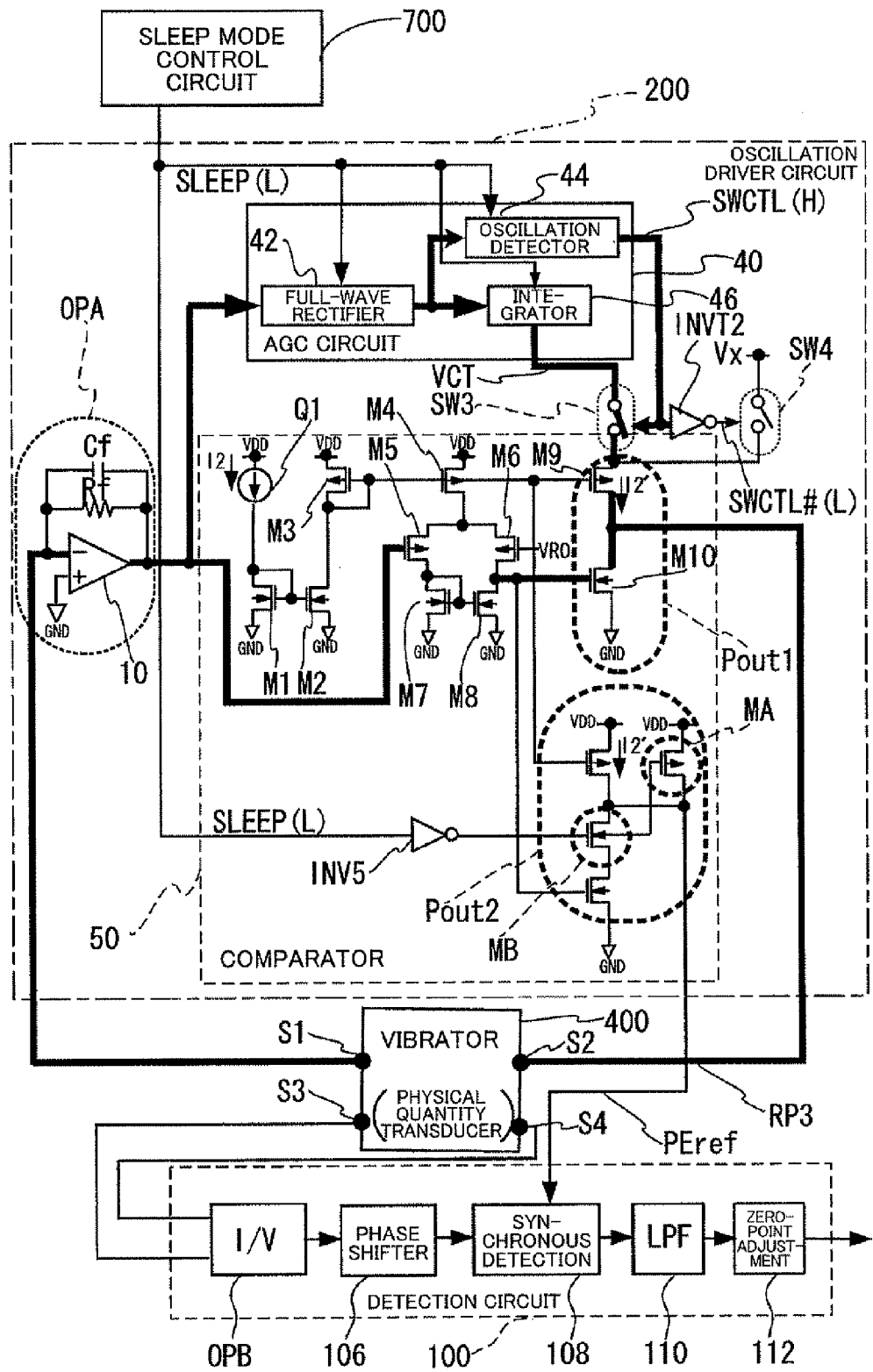
FIG. 15 is a circuit diagram showing a specific operation of the oscillation driver circuit shown in FIG. 14 during a steady oscillation state.
Figure 16:
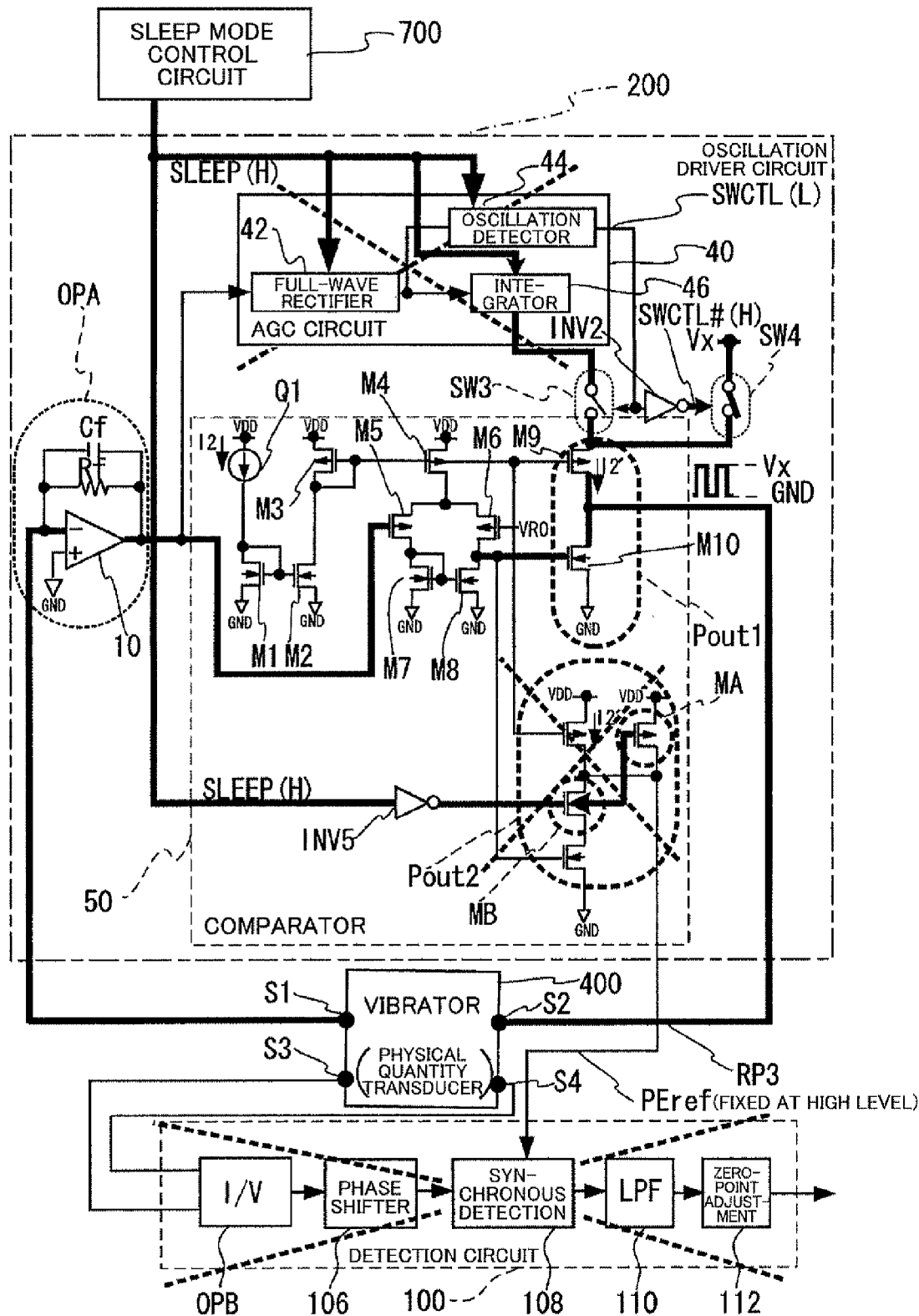
FIG. 16 is a circuit diagram showing a specific operation of the oscillation driver circuit shown in FIG. 14 during a sleep mode.

This embodiment illustrates a specific circuit configuration and an operation example of the oscillation driver circuit (and the physical quantity measurement device) using the method that changes the voltage amplitude of the signal output from the first output section (Pout1 or 53) of the comparator 50 corresponding to the oscillation state or the operation mode while using one oscillation loop (i.e., the method shown in FIGS. 5 and 6) with reference to FIGS. 14 to 16.

FIG. 14 is a circuit diagram showing a specific circuit configuration and the oscillation startup operation of the oscillation driver circuit (physical quantity measurement device) using the method that changes the voltage amplitude of the first output section. FIG. 15 is a circuit diagram showing a specific operation of the oscillation driver circuit shown in FIG. 14 during the steady oscillation state. FIG. 16 is a circuit diagram showing a specific operation of the oscillation driver circuit shown in FIG. 14 during the sleep mode. In FIGS. 14 to 16, the same sections as in the above-described embodiments are indicated by the same reference symbols.

Note that this embodiment employs the circuit configuration shown in FIG. 7 as the configuration of the comparator 50.

Circuit Configuration

As shown in FIG. 14, a physical quantity measurement circuit (vibrating gyrosensor circuit: IC) is formed by integrating the oscillation driver circuit 200 that includes the comparator 50 and the detection circuit 100. The oscillation driver circuit 200 includes the first and second power supply voltage switches (SW3 and SW4) for changing the high-potential-side power supply voltage supplied to the first output section (Pout1).

The second output section (Pout2) of the comparator 50 includes an NMOS transistor (MB) and a PMOS transistor (MA) in order to implement the sleep mode. The NMOS transistor (MB) is turned OFF during the sleep mode so that the operation of the second output section (Pout2) stops. At the same time, the PMOS transistor (MA) is turned ON so that the synchronous detection reference signal (PERef) is fixed at the high level.

Operation During Oscillation Startup

A path indicated by a bold solid line in FIG. 14 is utilized during oscillation startup. Specifically, the switch control signal (SWCTL) output from the oscillation detector 44 of the AGC circuit 40 is set at the L level so that the first power supply voltage switch SW3 is turned OFF and the second power supply voltage switch SW4 is turned ON.

The power supply voltage (Vx) that sets the loop gain to be larger than unity is supplied to the first output section (Pout1). The voltage Vx is normally the power supply voltage VDD. Note that the voltage Vx is not limited thereto. It suffices that the voltage Vx be a voltage that can set the loop gain to be larger than unity. For example, the voltage Vx may be a voltage higher than the power supply voltage VDD, or may be a voltage lower than the power supply voltage VDD by a small extent.

A rectangular-wave signal that swings to the maximum between the voltage Vx and the ground power supply voltage (GND) is output from the first output section (Pout1). This causes the loop gain in the first oscillation loop (RP1) to be larger than unity, and the physical quantity transducer (e.g., crystal vibrator) 400 is caused to oscillate in this state.

Operation During Steady Oscillation State

A path indicated by a bold solid line in FIG. 15 is utilized during the steady oscillation state. Specifically, the switch control signal (SWCTL) output from the oscillation detector 44 of the AGC circuit 40 is set at the H level so that the first power supply voltage switch (SW3) is turned ON and the second power supply voltage switch (SW4) is turned OFF.

The gain control signal (VCT) output from the integrator 46 of the AGC circuit 40 is supplied to the first output section (Pout1) as the high-potential-side power supply voltage. A rectangular-wave signal that swings to the maximum between the voltage Vx and the ground power supply voltage (GND) is output from the first output section (Pout1). Therefore, the loop gain in the first oscillation loop (RP1) is adjusted (negative-feedback-controlled) to be larger than unity.

Operation During Sleep Mode

A path indicated by a bold solid line in FIG. 16 is utilized during the sleep mode. Specifically, the sleep control signal (SLEEP) output from the sleep mode control circuit 700 is set at the H level (active level).

This causes the AGC circuit 40 and the second output section (Pout2) to be turned OFF. The entire detection circuit 100 is also turned OFF. This enables a further reduction in power consumption.

The second output section (Pout2) includes the NMOS transistor (MB) and the PMOS transistor (MA) in order to implement the sleep mode. The NMOS transistor (MB) is turned OFF during the sleep mode so that the operation of the second output section (Pout2) stops. At the same time, the PMOS transistor (MA) is turned ON so that the synchronous detection reference signal (PERef) is fixed at the high level.

Since the synchronous detection reference signal (PERef) is fixed at the high level, the synchronous detection circuit 108 does not operate. This also reduces power consumption.

When the AGC circuit 40 is turned OFF, the switch control signal (SWCTL) output from the oscillation detector 44 is necessarily set at the L level. This causes the first power supply voltage switch SW3 to be turned OFF and the second power supply voltage switch SW2 to be turned ON, whereby the power supply voltage (Vx) that sets the loop gain to be larger than unity is supplied to the first output section (Pout1) in the same manner as during oscillation startup.

A rectangular-wave signal that swings to the maximum between the voltage (Vx) and the ground power supply voltage (GND) is output from the first output section (Pout1). This causes the loop gain in the first oscillation loop (RP1) to be larger than unity, and the physical quantity transducer (e.g., crystal vibrator) 400 is caused to oscillate in this state.

The loop gain in the first oscillation loop RP1 during the sleep mode is maintained to be larger than unity. Therefore, a quick transition to the normal operation mode can be achieved when the sleep mode is canceled.

Sixth Embodiment

This embodiment illustrates an electronic instrument including the physical quantity measurement device (including the oscillation driver circuit, the detection circuit, and the physical quantity transducer) according to the invention.

Figure 17:
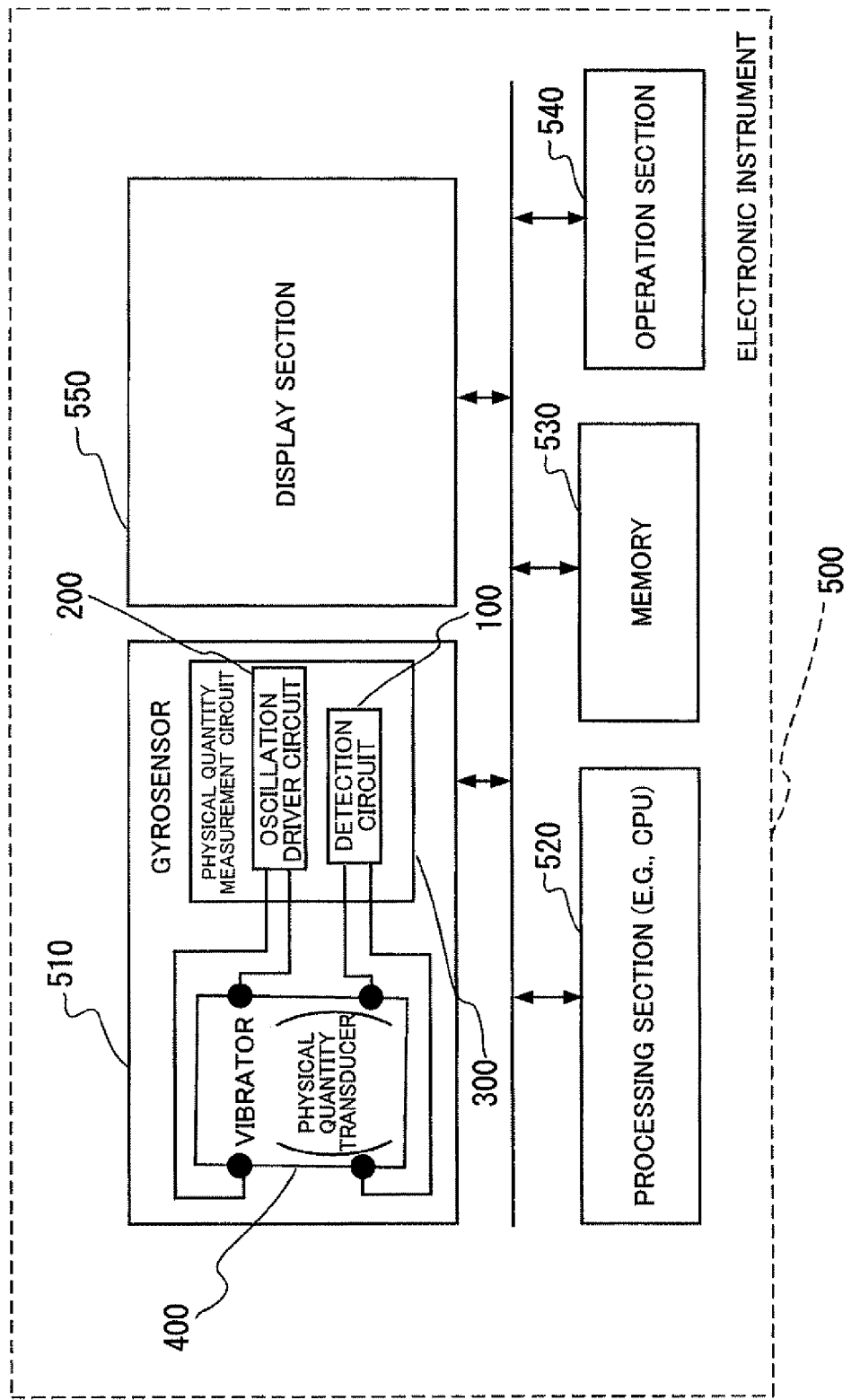
FIG. 17 is a circuit diagram showing the configuration of a physical quantity measurement device (including an oscillation driver circuit, a detection circuit, and a physical quantity transducer) according to the invention.

FIG. 17 is a circuit diagram showing the configuration of a physical quantity measurement device (including an oscillation driver circuit, a detection circuit, and a physical quantity transducer) according to the invention.

An electronic instrument (e.g., digital camera) 500 shown in FIG. 17 includes a gyrosensor (physical quantity measurement device) 510, a display section 550, a processing section 520 such as a CPU, a memory 530, and an operation section 540.

The gyrosensor 510 includes a physical quantity measurement circuit (vibrating gyrosensor circuit) 300 according to the invention shown in FIG. 1 and the like. The physical quantity measurement circuit (vibrating gyrosensor circuit) 300 includes the oscillation driver circuit 200 and the detection circuit 100, as described above.

A physical quantity transducer (crystal vibrator in this example) 400 is connected to the physical quantity measurement circuit (vibrating gyrosensor circuit) 300.

The physical quantity measurement circuit (vibrating gyrosensor circuit) 300 has a reduced size, consumes a small amount of power, can achieve a quick transition to the steady oscillation state, enables a reduction in power consumption utilizing the low power consumption mode (sleep mode), can achieve a quick transition from the low power consumption mode to the normal operation mode, and achieves a high physical quantity detection accuracy utilizing a crystal vibrator. Therefore, a gyrosensor (physical quantity measurement device) 510 connected to the physical quantity transducer (crystal vibrator) 400 achieves the same effects as those of the physical quantity measurement circuit (vibrating gyrosensor circuit) 300.

Likewise, the electronic instrument 500 including the gyrosensor (physical quantity measurement device) 510 according to the invention can be reduced in size, consumes a small amount of power, achieves a quick oscillation startup, has high reliability, and achieves a quick transition from the low power consumption mode (sleep mode) to the normal operation mode. When the electronic instrument 500 is a video camera or a digital still camera, for example, a highly accurate image stabilization process and the like can be achieved.

The performance of the electronic instrument 500 is improved according to the invention. The electronic instrument may be a car navigation system, an aircraft, or a robot instead of a digital camera.

According to at least one embodiment of the invention, the following effects can be obtained, for example. Note that the following effects are not necessarily achieved at the same time. Accordingly, the following effects do not in any way limit the technical scope of the invention.

(1) Since the gain control amplifier (GCA) and the circuit (e.g., comparator) that generates the synchronous detection reference signal can be formed using a common circuit, the size and the power consumption of the oscillation driver circuit can be reduced.

(2) Since the phase of the oscillation drive signal in the oscillation loop coincides with the phase of the synchronous detection reference signal (synchronization clock signal) by sharing the circuit, the detection accuracy of the physical quantity measurement device is improved due to the minimum phase shift.

(3) A quick transition to the steady oscillation state can be achieved.

(4) It is possible to prevent a situation in which the physical quantity transducer breaks down due to an overcurrent.

(5) A further reduction in power consumption can be achieved by utilizing the low power consumption mode.

(6) A quick transition from the low power consumption mode to the normal operation mode can be achieved.

(7) The physical quantity detection accuracy can be improved utilizing a crystal vibrator as the physical quantity transducer.

(8) A reduction in size and an increase in performance of electronic instruments can be achieved.

Although the invention has been described above based on the embodiments, those skilled in the art would readily appreciate that many modifications are possible in the embodiments without materially departing from the novel teachings and advantages of the invention. For example, the physical quantity measured using the physical quantity transducer is not limited to an angular velocity. The invention may also be applied to an acceleration sensor, an angular acceleration sensor, and the like.

Examples of a material for the physical quantity transducer include a constant modulus alloy such as elinvar and a ferroelectric single crystal (piezoelectric single crystal). Examples of such a single crystal include a rock crystal, lithium niobate, lithium tantalate, a lithium niobate-lithium tantalate solid solution, lithium borate, and langasite. It is preferable that the physical quantity transducer be hermetically sealed in a package. It is preferable that the package be filled with dry nitrogen or be under vacuum.

The invention is useful for an oscillation driver circuit, an oscillation driver device (e.g., an oscillation driver device using a crystal vibrator or a piezoelectric element as a physical quantity transducer), a physical quantity measurement device (e.g., vibratory gyroscope), and an electronic instrument (e.g., small video camera or digital still camera).

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An oscillation driver circuit that is connected to a physical quantity transducer to form an oscillation loop and causes the physical quantity transducer to produce driving vibrations by applying a rectangular-wave drive signal to the physical quantity transducer, the oscillation driver circuit comprising:

a drive current/voltage conversion amplifier circuit that converts a current signal from the physical quantity transducer into a voltage signal; and a comparator that receives the voltage signal output from the drive current/voltage conversion amplifier circuit through an input node, outputs a drive signal through a first output node, and outputs a synchronous detection reference signal through a second output node, the comparator including:

a differential section that compares the voltage signal input from the drive current/voltage conversion amplifier circuit with a given voltage;

a first output section that receives a signal output from the differential section, variably adjusts a voltage amplitude of the received signal, and outputs the resulting signal; and a second output section that receives the signal output from the differential section, and outputs the synchronous detection reference signal, a voltage amplitude of the synchronous detection reference signal being fixed.

2. The oscillation driver circuit as defined in claim 1, the oscillation driver circuit including an automatic gain control circuit that automatically adjusts a gain in the oscillation loop, when the oscillation loop is in a steady oscillation state, the comparator controlling a voltage amplitude of a rectangular-wave signal output from the first output section so that the gain in the oscillation loop becomes unity based on a gain control signal output from the automatic gain control circuit; and the second output section outputting a rectangular-wave signal as the synchronous detection reference signal, a voltage level of the rectangular-wave signal being a power supply voltage level of the oscillation driver circuit.

3. The oscillation driver circuit as defined in claim 1, the oscillation driver circuit including:

a first loop switch provided in a first signal path that connects the first output node with the physical quantity transducer; and a second loop switch provided in a second signal path that connects the second output node with the physical quantity transducer, the first loop switch and the second loop switch being complementarily turned ON, a first oscillation loop that passes through the first signal path being formed when the first loop switch is turned ON, and a second oscillation loop that passes through the second signal path being formed when the second loop switch is turned ON;

during oscillation startup, the second loop switch being turned ON, and the physical quantity transducer being caused to oscillate while setting a gain in the second oscillation loop to be larger than unity; and during the steady oscillation state, the first loop switch being turned ON, and the physical quantity transducer being caused to oscillate through the first oscillation loop, a gain in the first oscillation loop being adjusted to unity.

4. The oscillation driver circuit as defined in claim 3, the first loop switch and the second loop switch being complementarily turned ON based on an oscillation detection signal output from an oscillation detector included in the automatic gain control circuit.

5. The oscillation driver circuit as defined in claim 1, the oscillation driver circuit including a current limiter circuit that limits an amount of current that flows through at least either a current path that connects a high-potential-side power supply node and the second output node of the second output section or a current path that connects a low-potential-side power supply node and the second output node of the second output section.

6. The oscillation driver circuit as defined in claim 3, the oscillation driver circuit having at least a normal operation mode and a low power consumption mode, when the low power consumption mode has been selected, the oscillation driver circuit being partially turned OFF and the second loop switch being turned ON so that the physical quantity transducer is caused to oscillate while setting the gain in the second oscillation loop to be larger than unity.

7. The oscillation driver circuit as defined in claim 1, a voltage amplitude of a rectangular-wave signal output from the first output section of the comparator being adjusted so that a gain in the oscillation loop is larger than unity during oscillation startup, and adjusted so that the gain in the oscillation loop is unity during the steady oscillation state.

8. The oscillation driver circuit as defined in claim 7, the oscillation driver circuit including:

a first power supply voltage switch that supplies a first power supply voltage that adjusts the gain in the oscillation loop to unity to a high-potential-side power supply node of the first output section; and a second power supply voltage switch that supplies a second power supply voltage that adjusts the gain in the oscillation loop to be larger than unity to the high-potential-side power supply node of the first output section, the first power supply voltage switch and the second power supply voltage switch being complementarily turned ON; and the first power supply voltage switch being turned ON during the steady oscillation state, and the second power supply voltage switch being turned ON during oscillation startup.

9. The oscillation driver circuit as defined in claim 7, the oscillation driver circuit including a current limiter circuit that limits an amount of current that flows through at least either a current path that connects a high-potential-side power supply node and the first output node of the first output section or a current path that connects a low-potential-side power supply node and the first output node of the first output section.

10. The oscillation driver circuit as defined in claim 7, the oscillation driver circuit having at least a normal operation mode and a low power consumption mode, when the low power consumption mode has been selected, the oscillation driver circuit being partially turned OFF, and the voltage amplitude of the rectangular-wave signal output from the first output section of the comparator being adjusted so that the gain in the oscillation loop is larger than unity.

11. An oscillation driver device comprising:

the oscillation driver circuit as defined in claim 1; and the physical quantity transducer that is caused to oscillate by the oscillation driver circuit.

12. A physical quantity measurement circuit comprising:

the oscillation driver circuit as defined in claim 1; and a detection circuit that includes a detection current/voltage conversion amplifier circuit that converts a current signal from the physical quantity transducer into a voltage signal, and a synchronous detection circuit that performs a synchronous detection process based on the synchronous detection reference signal output from the oscillation driver circuit, the synchronous detection circuit being provided in a subsequent stage of the detection current/voltage conversion amplifier circuit.

13. A physical quantity measurement device comprising:

the physical quantity measurement circuit as defined in claim 12; and the physical quantity transducer that is caused to oscillate by the oscillation driver circuit.

14. An electronic instrument comprising the oscillation driver device as defined in claim 11.

15. An electronic instrument comprising the physical quantity measurement device as defined in claim 13.

* * * * *